US008562407B2

(12) United States Patent
Baerlocher et al.

(10) Patent No.: US 8,562,407 B2
(45) **Date of Patent: *Oct. 22, 2013**

(54) GAMING DEVICE HAVING A FREE SPIN GAME

(75) Inventors: Anthony J. Baerlocher, Reno, NV (US); Karen M. Cregan, Reno, NV (US); Michael MacVittie, Las Vegas, NV (US); Ryan W. Cuddy, Reno, NV (US)

(73) Assignee: IGT, Las Vegas, NV (US)

( * ) Notice: Subject to any disclaimer, the term of this patent is extended or adjusted under 35 U.S.C. 154(b) by 1949 days.

This patent is subject to a terminal disclaimer.

(21) Appl. No.: 11/465,734

(22) Filed: Aug. 18, 2006

(65) Prior Publication Data

US 2008/0200232 A1 Aug. 21, 2008

Related U.S. Application Data

(63) Continuation of application No. 10/953,812, filed on Sep. 29, 2004, now Pat. No. 7,094,148, which is a continuation-in-part of application No. 10/661,443, filed on Sep. 12, 2003, now Pat. No. 7,074,127, which is a continuation-in-part of application No. 10/241,255, filed on Sep. 11, 2002, now Pat. No. 7,056,213.

(51) Int. Cl.

| | |
|---|---|
| ***A63F 9/00*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .......... 463/16

(58) Field of Classification Search
USPC .......... 463/16, 17, 19
See application file for complete search history.

(56) References Cited

U.S. PATENT DOCUMENTS 4,198,052 A 4/1980 Gauselmann
4,448,419 A 5/1984 Telnaes (Continued)

FOREIGN PATENT DOCUMENTS

AU 564342 8/1987
AU 564355 10/1987

(Continued)

OTHER PUBLICATIONS

Williams Jackpot Stampede Deluxe Slot Machine Dotmation game description, written by WMS, printed from http://www.pinrepair.com/slots/wms/jackstam.htm on Jun. 30, 2009, available in 1998.

(Continued)

*Primary Examiner* — David L Lewis
*Assistant Examiner* — Reginald Renwick
(74) *Attorney, Agent, or Firm* — Neal, Gerber & Eisenberg LLP

(57) ABSTRACT

A gaming device including a re-initiation mode wherein the probability of extending the bonus game is increased by fixing the reel or reels displaying a locking symbol on the reel. In the re-initiation mode embodiment, the gaming device reactivates some or all of the reels except the reel displaying the locking symbol for a predetermined number of additional free spins or until the reactivated reels display or indicate a terminating symbol on the reels. The gaming device provides any outcomes associated with indicated symbols or combination of symbols. In one embodiment, if a terminating symbol is displayed on designated reels during one of the additional free spins, the gaming device re-initiates the bonus game.

94 Claims, 21 Drawing Sheets

(56) References Cited

U.S. PATENT DOCUMENTS 4,695,053 A 9/1987 Vazquez, Jr. et al.
4,838,552 A 6/1989 Hagiwara
4,991,848 A 2/1991 Greenwood et al.
5,067,712 A 11/1991 Georgilas
5,085,436 A 2/1992 Bennett
5,102,134 A 4/1992 Smyth
5,308,065 A 5/1994 Bridgeman et al.
5,332,228 A 7/1994 Schultz
5,342,049 A 8/1994 Wichinsky et al.
5,393,057 A 2/1995 Marnell, II
5,393,061 A 2/1995 Manship et al.
5,407,200 A 4/1995 Zalabak
5,423,539 A 6/1995 Nagao
5,431,408 A 7/1995 Adams
5,449,173 A 9/1995 Thomas et al.
5,536,016 A 7/1996 Thompson
5,542,669 A 8/1996 Charron et al.
5,560,603 A 10/1996 Seelig et al.
5,569,084 A 10/1996 Nicastro et al.
5,647,798 A 7/1997 Falciglia
5,722,891 A 3/1998 Inoue
5,766,074 A 6/1998 Cannon et al.
5,772,506 A 6/1998 Marks et al.
5,775,692 A 7/1998 Watts et al.
5,810,361 A 9/1998 Kadlic
5,823,873 A 10/1998 Moody
5,833,537 A 11/1998 Barrie
5,855,514 A 1/1999 Kamille
5,918,880 A 7/1999 Voigt, IV et al.
5,935,002 A 8/1999 Falciglia
5,964,463 A 10/1999 Moore, Jr.
5,971,849 A 10/1999 Falciglia
5,988,638 A 11/1999 Rodesch et al.
6,003,867 A 12/1999 Rodesch et al.
6,004,207 A 12/1999 Wilson, Jr. et al.
6,012,982 A 1/2000 Piechowiak et al.
6,033,307 A 3/2000 Vancura
6,056,642 A 5/2000 Bennett
6,059,289 A 5/2000 Vancura
6,059,658 A 5/2000 Mangano et al.
6,089,976 A 7/2000 Schneider et al.
6,089,977 A 7/2000 Bennett
6,102,400 A 8/2000 Scott et al.
6,102,798 A 8/2000 Bennett
6,120,031 A 9/2000 Adams
6,142,873 A 11/2000 Weiss et al.
6,142,874 A 11/2000 Kodachi et al.
6,142,875 A 11/2000 Kodachi et al.
6,155,925 A 12/2000 Giobbi et al.
6,159,095 A 12/2000 Frohm et al.
6,159,096 A 12/2000 Yoseloff
6,159,097 A 12/2000 Gura
6,159,098 A 12/2000 Slomiany et al.
6,173,955 B1 1/2001 Perrie et al.
6,174,233 B1 1/2001 Sunaga et al.
6,186,894 B1 2/2001 Mayeroff
6,190,254 B1 2/2001 Bennett
6,203,429 B1 3/2001 Demar et al.
6,220,959 B1 4/2001 Holmes, Jr. et al.
6,224,483 B1 5/2001 Mayeroff
6,231,442 B1 5/2001 Mayeroff
6,231,445 B1 5/2001 Acres
6,234,897 B1 5/2001 Frohm et al.
6,251,013 B1 6/2001 Bennett
6,270,409 B1 8/2001 Shuster
6,270,411 B1 8/2001 Gura et al.
6,290,600 B1 9/2001 Glasson
6,299,165 B1 10/2001 Nagano
6,299,170 B1 10/2001 Yoseloff
6,302,398 B1 10/2001 Vecchio
6,305,686 B1 10/2001 Perrie et al.
6,311,976 B1 11/2001 Yoseloff et al.
6,312,334 B1 11/2001 Yoseloff
6,315,660 B1 11/2001 DeMar et al.
6,315,663 B1 11/2001 Sakamoto
6,319,124 B1 11/2001 Baerlocher et al.
6,322,078 B1 11/2001 Adams
6,336,860 B1 1/2002 Webb
6,340,158 B2 1/2002 Pierce et al.
6,358,144 B1 3/2002 Kaddlic et al.
6,364,768 B1 4/2002 Acres et al.
6,375,570 B1 4/2002 Poole
6,394,902 B1 5/2002 Glavich et al.
6,398,218 B1 6/2002 Vancura
6,398,644 B1 6/2002 Perrie et al.
6,413,162 B1 7/2002 Baerlocher et al.
6,419,579 B1 7/2002 Bennett
6,439,943 B1 8/2002 Aoki et al.
6,439,993 B1 8/2002 O'Halloran
6,443,452 B1 9/2002 Brune
6,454,266 B1 9/2002 Breeding et al.
6,461,241 B1 10/2002 Webb et al.
6,471,208 B2 10/2002 Yoseloff et al.
6,481,713 B2 11/2002 Perrie et al.
6,491,584 B2 * 12/2002 Graham et al. .................. 463/25
6,494,454 B2 12/2002 Adams
6,537,150 B1 3/2003 Luciano et al.
6,537,152 B2 3/2003 Seelig et al.
6,561,904 B2 5/2003 Locke et al.
6,565,436 B1 5/2003 Baerlocher
6,602,137 B2 8/2003 Kaminkow et al.
6,604,740 B1 8/2003 Singer et al.
6,616,142 B2 9/2003 Adams
6,632,139 B1 10/2003 Baerlocher
6,632,140 B2 * 10/2003 Berman et al. .................. 463/18
6,641,477 B1 11/2003 Dietz, II
6,712,694 B1 3/2004 Nordman
6,733,389 B2 5/2004 Webb et al.
6,805,349 B2 10/2004 Baerlocher et al.
6,869,360 B2 3/2005 Marks et al.
6,905,406 B2 6/2005 Kaminkow et al.
6,913,532 B2 7/2005 Baerlocher et al.
6,921,335 B2 7/2005 Rodgers et al.
7,066,814 B2 6/2006 Glavich et al.
7,074,127 B2 * 7/2006 Cuddy et al. .................... 463/20
7,094,148 B2 * 8/2006 Baerlocher et al. ............. 463/20
2001/0009865 A1 7/2001 Demar et al.
2002/0010017 A1 1/2002 Bennett
2003/0060272 A1 3/2003 Glavich et al.
2003/0069062 A1 4/2003 Shimizu
2003/0073483 A1 4/2003 Glavich et al.
2003/0153383 A1 * 8/2003 Baerlocher et al. ............. 463/25
2003/0162585 A1 8/2003 Bigelow et al.
2003/0203753 A1 10/2003 Muir et al.
2004/0002372 A1 1/2004 Rodgers et al.
2004/0038731 A1 2/2004 Englman
2004/0048652 A1 3/2004 Ching et al.
2004/0053666 A1 3/2004 Vancura
2004/0053669 A1 3/2004 Gerrard et al.
2004/0053672 A1 3/2004 Baerlocher
2004/0072612 A1 4/2004 Rodgers et al.
2004/0137982 A1 7/2004 Cuddy et al.
2004/0147306 A1 7/2004 Randall et al.
2004/0266517 A1 12/2004 Bleich et al.
2005/0049035 A1 3/2005 Baerlocher et al.
2005/0070354 A1 * 3/2005 Baerlocher et al. ............. 463/20
2005/0233801 A1 10/2005 Baerlocher et al.
2006/0068884 A1 * 3/2006 Baerlocher et al. ............. 463/20
2006/0246989 A1 11/2006 Glavich et al.

FOREIGN PATENT DOCUMENTS

AU B-13331/88 9/1988
AU 199717601 B2 9/1997
AU 199917318 A1 9/1999
EP 0 874 337 A1 10/1998
EP 0945837 A2 9/1999
EP 0 981 119 A2 2/2000
EP 0984408 A2 3/2000
EP 1 513 117 A2 3/2005
GB 2 322 217 A 8/1998
WO WO 9732285 9/1997
WO WO 00/32286 6/2000
WO WO 00/66235 11/2000

(56) References Cited

FOREIGN PATENT DOCUMENTS

| | | | |
|---|---|---|---|
| WO | WO 00/76606 | A1 | 12/2000 |
| WO | WO 01/26019 | A1 | 4/2001 |
| WO | WO 2004/025584 | A2 | 3/2004 |

OTHER PUBLICATIONS

Williams Jackpot Stampede Slot Machine game description, written by WMS, printed from http://www.pinrepair.com/slots/wms/jpstamp.htm on Jun. 30, 2009, available in 1995.
Black Swan Paytable Display written by IGT, published prior to 2001.
Boot Scootin Article written by Strictly Slots/Aristocrat Leisure Industries, PTY Ltd., published date unknown.
Break the Spell Advertisement written by Atronic Casino Technology, Ltd., published in 1999.
Break the Spell Article written by Strictly Slots/Atronic Casino Technology, Ltd., published in Sep. 2000.
Break the Spell Atronic Web Page, published in Jan. 2001.
Break the Spell Brochure, published in 1999.
Cash Chameleon Article written by Strictly Slots/Aristocrat Leisure Industries, PTY Ltd., published in Apr. 2001.
Catch A Wave Advertisement written by IGT, published in Dec. 2000.
Cossack Dance Advertisement written by Olympic Video Gaming, published prior to 2002.
Description of Symbol Feature in Australian UFO Gaming Machine written by Barcrest Ltd., published in 1995.
Dolphin Treasure Advertisement written by Aristocrat Leisure Industries Pty., Ltd., published in 1996.
Double Bucks Brochure written by IGT, published earlier than 2001.
Double Diamond Line Advertisement written by Bally Gaming Systems, published in 2000.
Enchanted Forest™ Gaming Description from Aristocrat, available in 1994.
Enchanted Unicorn Advertisement written by IGT, published in 2001.
Family Feud Bullseye advertisement, printed from www.igtonline.com/megajackpots/new_games/family_feud_bullseye_slots.html on Mar. 2, 2005 and available in 2003.
Field Testing New Slots Article, written by Strictly Slots, published in Jul. 2000.
Fishin' Buddies Article published in Strictly Slots/Anchor Games, published in Apr. 2001.
Happy Camper Advertisement written by IGT, published in 2001.
Introducing the "Smiling Ape" Machine Advertisement (including Joker's Wild Poker description) written by IGT, published prior to 2001.
Jackpot Party Brochure and Articles written by WMS Gaming, Inc, published in 1988.
Jester Brochure written by IGT, published in 1999.
Joker's Wild Advertisement written by IGT, published prior to 2001.
Little Green Men, Jr. Advertisement written by A.C. Coin and Slot Services Company, published prior to 2002.
Loco Loot Article written by Strictly Slots/Aristocrat Leisure Industries, PTY Ltd., published in May 2002.
Mountain Money Article written by Strictly Slots/Aristocrat Leisure Industries, PTY Ltd., published in Jun. 2002.
On the House Advertisement written by Olympic Video Gaming, published prior to 2002.
Penguin Pays Advertisement written by Aristocrat Incorporated, published in 1998.
Reel Magic™ Gaming Machine Description written by IGT, available in 1986.
Spin Til You Win Game Description written by IGT, published in 1996.
The Basics of Winning Video Poker (Chapter VI Deuces Wild & Chapter VII Jokers Wild) written by J. Edward Allen, published in 1990.
The Latest Buzz Article written by Bally Gaming Systems, published in Fall 2000.
Wild Bear Salmon Run Advertisement written by IGT, published in 2003.
Wild Streak Advertisement written by WMS Gaming, Inc., published in 2001.
Your Real Key to Gaming Success Advertisement (including Roll Over Beethoven and Wild Fortune) written by Olympic Video Gaming, published dated unknown.

* cited by examiner

| SYMBOL COMBINATION | AWARD |
|---|---|
| AAA | 10,000 |
| BBB | 1000 |
| CCC | 500 |
| DDD | 100 |
| EEE | 75 |
| FFF | 50 |
| GGG | 25 |
| HHH | 10 |
| WILD WILD WILD | 10 |
| ◇ ◇ ◇ | 5 |

FIG. 4A

| SYMBOL COMBINATION | PROBABILITY OF A SYMBOL ON REEL 1 | PROBABILITY OF A SYMBOL ON REEL 2 | PROBABILITY OF A SYMBOL ON REEL 3 | PROBABILITY TOTAL |
|---|---|---|---|---|
| AAA | 1/20 | 1/20 | 1/20 | 1/8000 |
| BBB | 1/20 | 1/20 | 1/20 | 1/8000 |
| CCC | 1/20 | 1/20 | 1/20 | 1/8000 |
| DDD | 1/20 | 1/20 | 1/20 | 1/8000 |
| EEE | 1/20 | 1/20 | 1/20 | 1/8000 |
| FFF | 1/20 | 1/20 | 1/20 | 1/8000 |
| GGG | 1/20 | 1/20 | 1/20 | 1/8000 |
| HHH | 1/20 | 1/20 | 1/20 | 1/8000 |
| WILD WILD WILD | 1/20 | 1/20 | 1/20 | 1/8000 |
| ◇ ◇ ◇ | 1/20 | 1/20 | 1/20 | 1/8000 |
| ▭ ▭ ▭ | 10/20 | 10/20 | 10/20 | 1/8 |

FIG. 4B

| SYMBOL | PROBABILITY OF THE TRIGGER SYMBOL | PROBABILITY OF A SYMBOL ON REEL 1 | PROBABILITY OF A SYMBOL ON REEL 2 | PROBABILITY OF A SYMBOL ON REEL 3 | PROBABILITY TOTAL |
|---|---|---|---|---|---|
| A | 1/20 | | 1/9 | | 1/180 |
| B | 1/20 | | 1/9 | | 1/180 |
| C | 1/20 | | 1/9 | | 1/180 |
| D | 1/20 | | 1/9 | | 1/180 |
| E | 1/20 | | 1/9 | | 1/180 |
| F | 1/20 | | 1/9 | | 1/180 |
| G | 1/20 | | 1/9 | | 1/180 |
| H | 1/20 | | 1/9 | | 1/180 |
| WILD | 1/20 | | 1/9 | | 1/180 |

GAMING DEVICE HAVING A FREE SPIN GAME

PRIORITY CLAIM

This application is a continuation application of U.S. patent application Ser. No. 10/953,812, filed on Sep. 29, 2004, now U.S. Pat. No. 7,094,148 which is a continuation-in-part of U.S. patent application Ser. No. 10/661,443, filed on Sep. 12, 2003, now U.S. Pat. No. 7,074,127 which is a continuation-in-part of and claims the benefit of U.S. patent application Ser. No. 10/241,255, filed Sep. 11, 2002, now U.S. Pat. No. 7,056,213 the entire contents of which are incorporated herein.

CROSS REFERENCE TO RELATED APPLICATIONS

This application is related to the following commonly-owned co-pending patent applications: "GAMING DEVICE HAVING FREE GAMES BONUS WITH A CHANGING MULTIPLIER," Ser. No. 10/086,146; "GAMING DEVICE HAVING A BONUS GAME WITH MULTIPLE PLAYER SELECTABLE AWARD OPPORTUNITIES," Ser. No. 10/237,207; "GAMING DEVICE HAVING EXTENDER SYMBOLS," Ser. No. 10/191,197; "GAMING DEVICE HAVING A BONUS GAME WITH MULTIPLE PLAYER SELECTABLE AWARD OPPORTUNITIES," Ser. No. 10/660,076; "GAMING DEVICE HAVING SEQUENTIAL ACTIVATIONS OF A GAME AND REPLAY OF PREVIOUS ACTIVATIONS OF THE GAME," Ser. No. 10/956,508; "GAMING DEVICE WITH CHANGING WILD SYMBOLS," Ser. No. 10/956,303; "GAMING DEVICE HAVING FREE SPIN MODE WITH SYMBOL ELIMINATION," Ser. No. 10/953,818; "GAMING DEVICE HAVING A RE-TRIGGERING SYMBOL BONUS SCHEME WITH A BONUS SYMBOL ACCUMULATOR AND PLAYER SELECTION OF ACCUMULATION TOTAL," Ser. No. 10/952,656; "GAMING DEVICE HAVING TRANSFORMABLE WILD SYMBOLS OR CARDS WITH WILD SIGNAL INDICATORS," Ser. No. 10/920,798; "GAMING DEVICE HAVING WILD INDICATORS," Ser. No. 11/015,842; "GAMING DEVICE HAVING WILD INDICATORS," Ser. No. 10/982,096; "GAMING DEVICE WITH WILD ACTIVATION SYMBOLS AND WILD TERMINATION SYMBOLS." Ser. No. 10/966,223; "GAMING DEVICE HAVING A RE-TRIGGER SYMBOL BONUS SCHEME," Ser. No. 11/156,112; "GAMING DEVICE HAVING A FREE SPIN GAME INCLUDING AN ACCUMULATED MODIFIER," Ser. No. 11/216,323; "GAMING DEVICE AND METHOD HAVING FREE ACTIVATION MODE AND FREE ACTIVATION MODE WITH FREE ACTIVATION RE-TRIGGER," Ser. No. 11/217,182; "GAMING DEVICE HAVING A PROBABILITY ENHANCING TRIGGER SYMBOL," Ser. No. 11/419,681; "GAMING DEVICE HAVING A PROBABILITY ENHANCING TRIGGER SYMBOL," Ser. No. 11/419,680; "GAMING DEVICE INCLUDING A GAME HAVING A WILD SYMBOL RELATED AWARD," Ser. No. 11/463,815; "GAMING DEVICE INCLUDING A GAME HAVING A WILD SYMBOL RELATED AWARD," Ser. No. 11/463,818; "GAMING DEVICE HAVING A FREE SPIN GAME," Ser. No. 11/459,872; "GAMING DEVICE HAVING A PROBABILITY ENHANCING TRIGGER SYMBOL," Ser. No. 11/456,016; and "GAMING DEVICE INCLUDING A GAME HAVING A WILD SYMBOL RELATED AWARD," Ser. No. 11/464,347.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible. Providing a game in which a player has an opportunity to win potentially large awards or credits is one way to enhance player enjoyment and excitement.

Currently, gaming machines or devices provide games wherein a player has one or more opportunities to obtain a winning symbol combination on mechanical or video reels. The winning symbol combination may be along the same payline or on different paylines (known as a scatter pay). By providing gaming devices with more winning symbol combinations, players have more opportunities to receive an award.

In known gaming devices, however, the probability of obtaining the largest award (i.e., the jackpot award) is typically much lower than the probability of obtaining the other awards in a game. Thus, although a player may obtain more awards in a game, these awards are generally the relatively small awards and not the relatively large awards such as the jackpot award.

Many jurisdictions have regulations that prohibit changing the probability of occurrence associated with the reel symbols. This makes it more difficult to create bonus or secondary games with high payouts using the base game reels and reel symbols.

Gaming devices that increase the probability of obtaining the relatively large award and specifically, the jackpot award, are desirable. To increase player enjoyment and excitement, it is desirable to provide new games and gaming devices which increase the likelihood or probability that the player will obtain one or more relatively large awards in a game.

SUMMARY OF THE INVENTION

The present invention is directed to a gaming device including an award mode and a re-initiation mode of a primary game or bonus game where the probability of obtaining an award or an outcome and, specifically, a relatively large award increases when the player enters the award mode or the re-initiation mode of the bonus game.

In one embodiment, the gaming device includes a plurality of reels, each having a plurality of symbols. These symbols include a plurality of award symbols, at least one non-award symbol or null symbol or blank, at least one trigger symbol or symbol combination, and at least one wild symbol. One or more paylines are associated with the reels to indicate symbols or symbol combinations on the reels which are evaluated for winning symbol combinations. The symbols may be any suitable symbols such as letters, numbers, characters or any other suitable images. The award mode also includes a triggering event which, in one embodiment, includes a trigger symbol occurring on the reels. In one embodiment, the triggering event occurs when the trigger symbol is indicated on a designated reel on one of the paylines associated with the reels. In another embodiment, the triggering event occurs when the trigger symbol occurs on any of the paylines.

In a primary game, the gaming device initiates the award mode when the triggering event occurs in the game. In the award mode, the gaming device holds the reel including the trigger symbol stationary while activating or spinning the other reels until those reels indicate a wild symbol on the payline. The gaming device then holds the reels including the wild symbols stationary while reactivating or re-spinning the reel including the trigger symbol. Thus, the award mode effectively reduces the game to a single reel game where only one of the award symbols on the reel indicates a winning symbol combination in the award mode.

In the award mode, the gaming device re-activates or re-spins the reel including the trigger symbol until one of the award symbols is indicated on the payline on that reel. For instance, if a non-award or null symbol, or the trigger symbol is indicated on the payline in the award mode, the gaming device re-spins the reel until one of the award symbols or the wild symbol is indicated on the payline. The null symbols and the trigger symbol do not provide an award to the player in the award mode but, instead, cause the gaming device to re-spin the reels. Therefore, the player is guaranteed to receive one of the award symbols or the wild symbol in the award mode before the award mode ends. Reducing the number of symbols that may be indicated on the payline to end the game, increases the probability that any one of the award symbols will be indicated on the payline. The gaming device then provides the award associated with the indicated award symbol or the indicated award symbol combination to the player. The award is added to the player's total award in a total award display and the bonus mode ends. In another embodiment, the player continues to re-activate the reels in the award mode if the player has spins remaining in the award mode.

The gaming device of the present invention effectively reduces the game to a single reel game or event which increases the probability or chance that a player will obtain an award in the award mode and, specifically, that the player will obtain a relatively large award such as a jackpot award in the award mode. For example, in a three-reel slot game, if each of the reels in the game includes twenty symbols including the trigger symbol, wild symbol, and non-award or null symbols, the probability or chance of obtaining an award symbol combination in that game is $(1/20)\times(1/20)\times(1/20)$ or 1 in 8000.

In the award mode the game is reduced to a single reel game as described above. Therefore, the probability of obtaining an award symbol (or symbol combination) in the award mode significantly increases. The probability is determined by multiplying the probability of the trigger symbol being indicated in the primary game (i.e., 1 in 20) by the probability of indicating one of the award symbols occurring in the award mode (i.e., 1 in 9). Therefore, the probability of one of the award symbols (or symbol combinations) being indicated in the game (through the award mode) is $(1/20)\times(1/9)$, which equals a probability of $(1/180)$. Thus, it is significantly more likely that the player will obtain one of the award symbols and, therefore, a winning award symbol combination in the game through the award mode. This increases the player's excitement and enjoyment of the game because the player has a greater opportunity or probability of obtaining the relatively large award or jackpot award in the award mode.

In one embodiment, a probability of being indicated on the payline is associated with each of the symbols on the reels. In one aspect of this embodiment, the probability associated with the trigger symbol is less than the probability associated with at least one of the award symbols, null symbols and the wild symbol on the reels. In another aspect of this embodiment, the probability associated with the trigger symbol is less than a plurality of the probabilities associated with the award symbols, null symbols and the wild symbol. In a further aspect of this embodiment, the probability associated with the trigger symbol is less than all of the probabilities associated with the award symbols, null symbols and the wild symbol in the game.

Similarly, in another embodiment, the award symbols include one relatively large award and several relatively small awards. In this embodiment, a probability of being indicated on the payline is associated with the award symbols such that the probability associated with the award symbol including the relatively large award is less than at least one of the probabilities associated with the award symbols including the relatively small awards being indicated on the payline. In another embodiment, the probability associated with the award symbol including the relatively large award is less than a plurality of the probabilities associated with the award symbols including the relatively small awards. In a further embodiment, the probability associated with the award symbol including the relatively large award is less than all of the probabilities associated with the award symbols including the relatively small awards.

In a further embodiment, the award mode of the present invention includes an award associated with a winning symbol combination including all wild symbols. In this embodiment, if the award mode is initiated and a wild symbol is indicated on the payline associated with the reels, in combination with the other wild symbols indicated on the payline, the gaming device provides the maximum or largest award in the game, such as the jackpot award. In another embodiment, the gaming device provides a predetermined award associated with a winning symbol combination including wild symbols in the game.

It should be appreciated that although the present application primarily discusses a trigger symbol, a combination of symbols (i.e., a trigger symbol combination) could be employed to trigger the award mode. It should also be appreciated that the trigger symbol could function as a wild symbol and one of the other reels could be re-activated.

In an alternative embodiment of the present invention, the probability-enhancing symbol includes a wild symbol which re-initiates or extends a bonus game. When a wild symbol occurs on at least one of a plurality of reels or designated reels, the gaming device locks, fixes, or holds stationary the position of the reel displaying the wild symbol and re-activates only the designated reels. The gaming device proceeds to hold stationary any designated reel displaying a wild symbol. As each reel displaying a wild symbol is held, the probability of obtaining a wild symbol on all of the designated reels is enhanced.

In one embodiment, the gaming device includes a plurality of reels, each having a plurality of symbols. The reels may be mechanical or video reels and include several symbols. In one embodiment, in addition to at least two wild symbols on separate or different reels, the symbols include a plurality of award symbols and at least one non-award symbol or null symbol or blank. The symbols may be any suitable symbols such as letters, numbers, characters or any other suitable images.

One or more paylines are included in the display to indicate symbols or symbol combinations on the reels which are evaluated for winning symbol combinations. It should be appreciated that any suitable number of paylines may be employed in the game.

A plurality of awards are associated with the award symbols or combination of award symbols according to a paytable. If an award symbol or combination of award symbols has an associated award and is indicated on an activated payline, the gaming device provides the associated award or awards in each spin of the reels. In one embodiment, no award is associated with a null symbol.

In one embodiment, the game play includes providing one or more free spins of the reels to the player. A "spins remaining" display indicates the number of spins remaining in a game. The number of free spins may be randomly determined, predetermined, determined by a wager made by a player, or determined according to any suitable method. In each spin, the gaming device determines the award, if any, associated with any indicated award symbols on the reels as discussed above.

The gaming device, in one embodiment, provides the player with a total award in each of the spins where the total award is based on the award and/or modifiers associated with the award symbols indicated in each spin. The total award in each of the spins is added to the player's total award indicated in the total award display. The gaming device or the player continues to spin the reels until there are no spins remaining. The gaming device then provides the player with the total award indicated in the total award display at the end of the game.

In one embodiment, upon a triggering event in a base game or bonus game, the player enters a game-extending or bonus game-extending or re-initiation mode. In one embodiment, the re-initiation mode is triggered when a wild symbol is displayed on one of the designated reels or paylines. In one embodiment, the wild symbol occurs when the wild symbol is indicated on a designated reel on one of the paylines associated with the reels. In another embodiment, the wild symbol occurs on the reels when the wild symbol is indicated on any of the paylines. In a further embodiment, the wild symbol occurs on a designated reel if the wild symbol is generated at any displayed position on the reel. Thereafter, in one embodiment of the re-initiation mode, certain designated reels undergo a predetermined number of spins to determine if the player will continue in the base or bonus game.

In the re-initiation mode, the gaming device holds stationary or fixes the position of the reel(s) which include wild symbols. The gaming device concurrently, either simultaneously or sequentially, activates or spins the other designated reels a predetermined or accumulated number of free spins or until a wild symbol is displayed on the reels or indicated on a payline. Alternatively, the gaming device re-activates or re-spins any of the reels not displaying a wild symbol including, non-designated reels. If wild symbols are generated and displayed on each of the designated reels or paylines within the predetermined number of spins, the gaming device re-initiates the bonus game. In another embodiment, if the player has spins remaining in the re-initiation mode, the gaming device continues to re-activate the non-designated reels in the re-initiation mode to potentially increase the total award.

In one embodiment, the game reduces the number of reels on which a wild symbol must be displayed by locking or holding stationary the reel or reels that display a wild symbol as described above. Reducing the number of reels on which wild symbols must appear in order for the bonus game to be extended increases the probability that any one of the wild symbols will be indicated on the payline or reel. In one embodiment, in which fewer than the total number of reels are designated to display wild symbols to re-initiate the bonus game, the gaming device effectively reduces the game to a double or single-reel game or event. The reduction of the number of reels on which a wild symbol must be displayed increases the probability or chance that a combination of reels displaying wild symbols will occur to re-initiate the bonus game and obtain a larger award.

The probability is determined by multiplying the probability of the wild symbol being indicated on each of the reels or on the same payline of each of the reels in the bonus game. As discussed above, in a three-reel slot game, if each of the reels in the game includes twenty symbols, including one wild symbol, the probability or chance of obtaining a combination of wild symbols on the same paylines of all three reels is $(1/20)\times(1/20)\times(1/20)$ or 1 in 8000 or 0.0125%. The probability of indicating wild symbols on the same payline for two reels is for two reels is $(1/20)\times(1/20)$, which equals a probability of 1 in 400 or 0.25%, and, for one reel, 1 in 20 or 5%. Thus, it is significantly more likely that the player will obtain the combination of wild symbols required to extend the bonus game when the reels are locked upon displaying a wild symbol. This increases the player's excitement and enjoyment of the game because the player has a greater opportunity or probability of obtaining the relatively large award or jackpot award in subsequent play of the bonus game.

In one embodiment, a probability of being indicated on the payline is associated with each of the symbols on the reels. In one aspect of this embodiment, the probability associated with the wild symbols is less than the probability associated with at least one of the award symbols, and null symbols on the reels. In another aspect of this embodiment, the probability associated with the wild symbol is less than a plurality of the probabilities associated with the award symbols and null symbols. In a further aspect of this embodiment, the probability associated with the wild symbol is less than all of the probabilities associated with the award symbols and null symbols.

Similarly, in another embodiment, the award symbols include one relatively large award and several relatively small awards and have a probability of being indicated on the payline associated with the award symbols as discussed above.

In another embodiment, during the re-initiation mode, the gaming device provides a predetermined award associated with a winning symbol combination including wild symbols in the game. The wild symbol in this embodiment represents any symbol necessary to create a winning combination. For example, if a combination of three like symbols adjacent to one another on a payline generate an award, then two like symbols adjacent to a wild symbol will provide a winning combination to the player.

In a further embodiment, the re-initiation mode of the present invention includes an award associated with a winning symbol combination including a wild symbol or a combination including all wild symbols. In this embodiment, if the re-initiation mode is triggered and the wild symbols are indicated on the same payline, the gaming device provides the maximum or largest award in the game, such as the jackpot award.

Upon re-initiation of the bonus game, the gaming device resumes providing the player the award associated with any winning symbol or symbol combination indicated on the reels. It should be appreciated that the player may again be transferred to an award mode as discussed above. Any award provided to the player is added to the player's total award in a total award display, and the bonus mode continues until another wild symbol is generated on a designated reel or payline.

It should be appreciated that the present invention can be achieved with other suitable symbols besides the wild symbol.

Although the present invention is described with respect to a free spins game or a bonus game in certain embodiments, it should be appreciated that the present invention may be employed as a primary game, or bonus game or any other suitable type of game in a wagering gaming device. Additionally, although the present invention is described with respect to a reel type game, it should be appreciated that the present invention may be employed in any suitable non-reel type games such as a video poker game.

It should thus be appreciated that in one embodiment, the present invention provides a gaming device including a primary game operable upon a wager by a player, and a triggering event associated with the primary game. After the triggering event occurs, a generation of one or more symbols occurs without an additional wager by the player. The player is provided any award associated with any of the generated symbols from the generation. This generation and award process is repeated until a designated symbol or symbol combination occurs. In one embodiment, there is a limit to the number of generations. Other embodiments do not include a pre-set limit. After the designated symbol or symbol combination occurs, a subsequent event occurs. The result of the subsequent event is either a non-terminating result or a terminating result. In one embodiment, the terminating result (such as the failure to generate a designated number of symbols such as designated or wild symbols) and the non-terminating result (such as the generation of a designated number of designated or wild symbols). If the non-terminating result occurs, the generation and award process begins again. If the terminating result occurs, the generation and award process does not begin again and the game ends.

In one further embodiment, the gaming device includes a game operable upon a wager by a player, a plurality of reels in the game, a plurality of symbols on the reels, and a triggering event associated with the generation of one or more designated symbols on the reels. After the triggering event occurs, a generation of a plurality of the symbols occurs on the reels without an additional wager by the player. The player is provided any award associated with any winning combinations of generated symbols on the reels from the generation. The generation and award steps are repeated until a designated symbol or symbol combination occurs on the reels. If the designated symbol or symbol combination occurs, a subsequent event occurs, wherein the result of that event is either a terminating result or a non-terminating result are based on the number of designated symbols generated in said event. If the non-terminating result occurs, the generation and award process begins again. If the terminating result occurs, the generation and award process does not begin again.

In a further embodiment, the gaming device includes a game operable upon a wager by a player, a plurality of reels in the game, and a plurality of symbols on the reels which include at least two designated symbols. One of the designated symbols is on each of two different reels. A triggering event is associated with the generation of one or more designated symbols on the reels. After the triggering event, a generation of a plurality of the symbols on the reels occurs without an additional wager by the player. The player is provided any award associated with any winning combinations of generated symbols on the reels from the generation. This generation and award process continues until one of the designated symbols is generated on one of the reels in the generation. If one of the designated symbols is generated on one of the reels in the generation, the position of the reel with the designated symbol is locked for a designated number of further generations of symbols on a designated number of other reels. If a non-terminating event occurs such as a designated number of other designated symbols being generated on the reels in the designated number of further generations, the reel are unlocked and the above generation and award process begins. If a terminating result occurs such as designated number of other wild symbols are not generated on the reels in the designated number of further generations, no further generations of the reels occurs until another wager is made in the game. It should be appreciated that one embodiment includes providing the player any award associated with any winning combinations of generated symbols on the reels from each further generation. In one embodiment, if one of said designated symbols is generated on one of said reels in one of the further generations, that reel is locked, and the designated number of further generations of symbols occurs on a plurality of the reels with designated symbols. In one embodiment, each reel that generates one of the designated symbols is locked for the subsequent further generations of symbols until the designated number of other designated symbols are generated on the reels or the designated number of other designated symbols are not generated on the reels in the designated number of further generations.

In an alternative embodiment of the present invention, the gaming device includes a primary game operable upon a wager. The primary game includes a plurality of reels and a plurality of symbols on the reels. In one embodiment, the symbols include at least one triggering symbol or triggering symbol combination. In another embodiment, the symbols also include at least one wild symbol. In one embodiment, the gaming device includes a free spin mode that is initiated when a triggering symbol or triggering symbol combination occurs on at least one of the reels in the primary game.

In this embodiment, when the free spin mode is initiated, the gaming device provides a player with an unlimited number of free spins without any additional wagers. In each free spin, the reels or symbol generators are activated and generate a plurality of symbols. The generated symbols are evaluated based on a paytable associated with the game. The gaming device provides an award to the player if any winning symbol combination occurs on the reels. The symbols also include at least one locking symbol and at least one coacting-terminating symbol. In one embodiment, unless the locking symbol and the terminating symbol both occur on the reels, they have no function. It should be appreciated that in other embodiments, the locking symbol and terminating symbol may have certain designated functions, even if they appear separately. In one embodiment, the free spin mode includes a free spin mode terminating event or limiting event. The free spin mode terminating event or limiting event is fulfilled upon the occurrence of at least one locking symbol and at least one terminating symbol generated on any of the reels. After the terminating event, the gaming device provides the player with a number of additional free spins or limits the further number of free spins. Any reels containing a locking symbol are held stationary for the number of additional free spins or free spins remaining. In this embodiment, the locking symbol can function as an expanding wild symbol on the reel. For example, on the stationary reels, at least one non-locking symbol may be changed into a locking symbol. In one embodiment, all of the locking symbols are wild for each of the number of additional free spins. In one embodiment, the free spin mode includes a free spin mode re-initiation event which occurs when at least one terminating symbol appears on any of the reels during any of the additional free spins.

It should thus be appreciated that in one embodiment, the gaming device includes a primary game controlled by a processor and operable upon a wager by a player, includes a plurality of reels, and a plurality of symbols on the reels including at least one triggering symbol or triggering symbol combination. The gaming device also includes a free spin mode that is initiated if the triggering symbol or triggering symbol combination occurs on at least one of the reels in the game. The free spin mode includes an unlimited number of free spins without an additional wager by the player. An award is provided to the player when any winning symbol combination occurs on the reels. The symbols include at least one locking symbol and at least one terminating symbol. The free spins mode includes a free spin mode terminating event, which is triggered upon the occurrence of at least one locking symbol and at least one terminating symbol on the reels. After the free spin mode terminating event, one, a plurality or all of the reels which generated the locking symbol are held stationary, one, a plurality or all of the locking symbols are designated wild, and the player is provided with at least one additional free spin.

In one alternative embodiment, the free spins mode includes a free spin mode re-initiation event. The re-initiation event can occur after the terminating event and includes the re-occurrence of at least one terminating symbol during any of the additional free spins. After the re-initiation event has occurred, the gaming device re-initiates the unlimited free spin mode.

It is therefore an advantage of the present invention to provide a gaming device that provides an increase probability of obtaining awards in a game.

Another advantage of the present invention is to provide a gaming device that increases the probability of obtaining a relatively large award in a game.

It is a further advantage of the present invention to provide a gaming device that increases the probability of obtaining the jackpot award in a game.

It is a further advantage of the present invention to provide a gaming device that increases the probability of extending the bonus game in a game.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 4A is probability table illustrating the probability of each of the symbols being indicated on each of the reels in a primary game.

FIG. 4B is probability table illustrating the probability of each of the symbols being indicated on each of the reels in an award mode.

DETAILED DESCRIPTION OF THE INVENTION

Gaming Device and Electronics

Figure 1A:
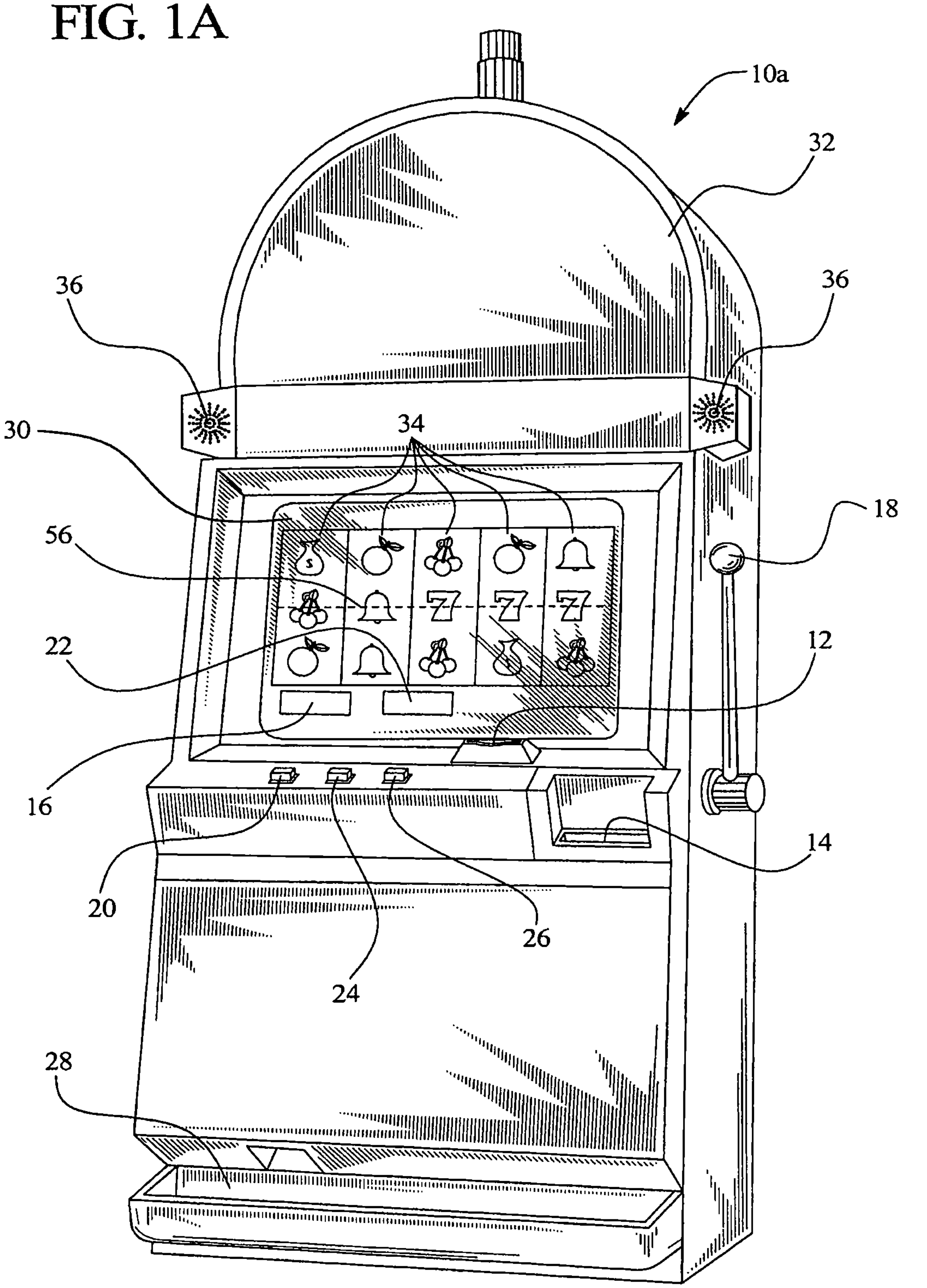
FIG. 1A is a front perspective view of one embodiment of the gaming device of the present invention.
Figure 1B:
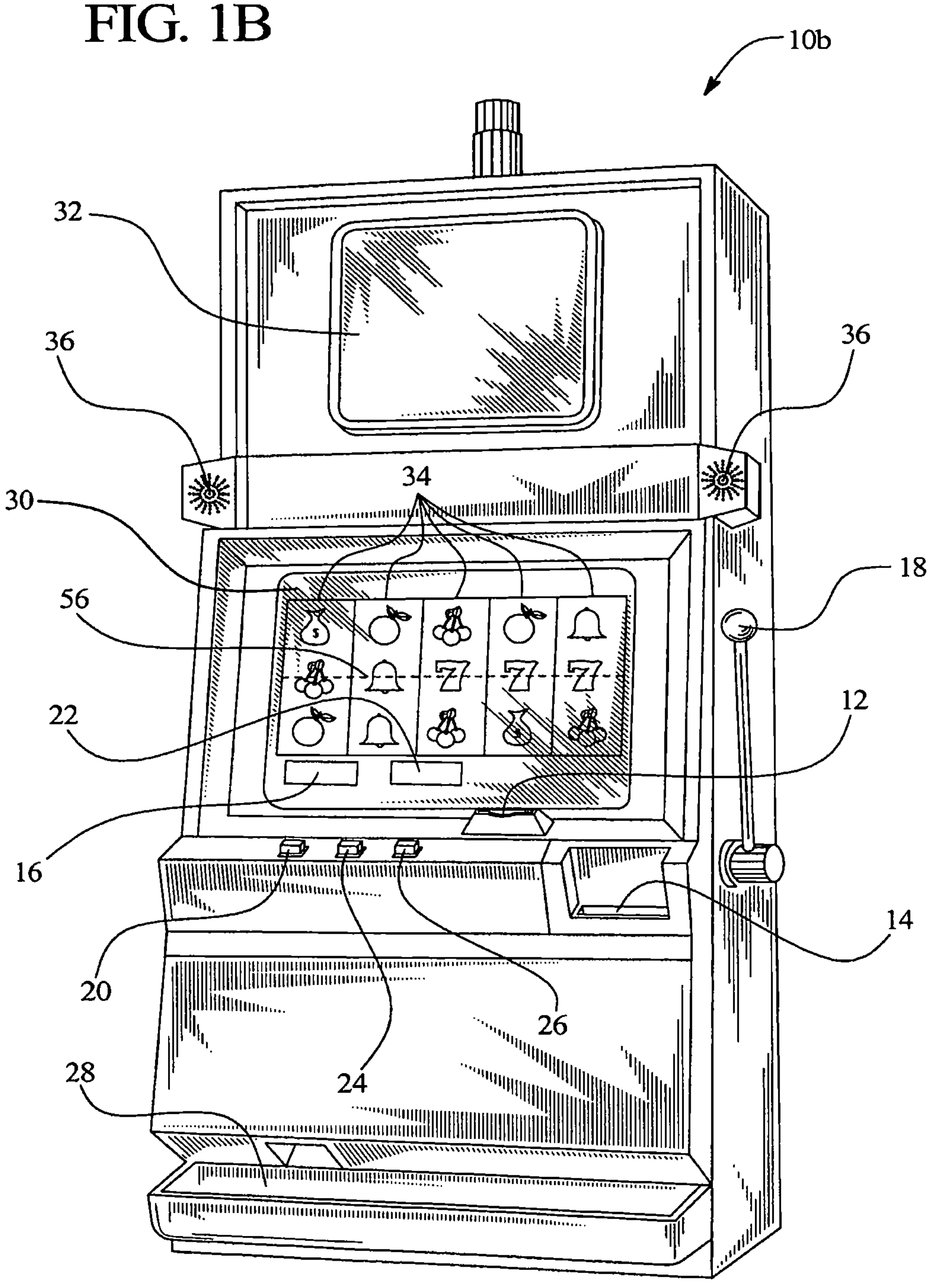
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 in one embodiment has the controls, displays and features of a conventional slot machine. It is constructed so that a player can operate it while standing or sitting, and gaming device 10 is preferably mounted in a cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device, which a player can use in a desktop or laptop personal computer or other computerized platform.

Gaming device 10 can incorporate any primary game such as slot, poker, blackjack or keno, and any of the bonus triggering events and bonus games associated with these primary games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player, which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. Other bet or wager indicators such as a bet max button may also be employed in the gaming device of present invention.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, an upper display device 32, and the alternative embodiment shown in FIG. 1B includes a central display device 30 as well as an upper display device 32. Gaming device 10 in one embodiment displays a plurality of reels 34 such as three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for producing sounds such as music.

Figure 2:
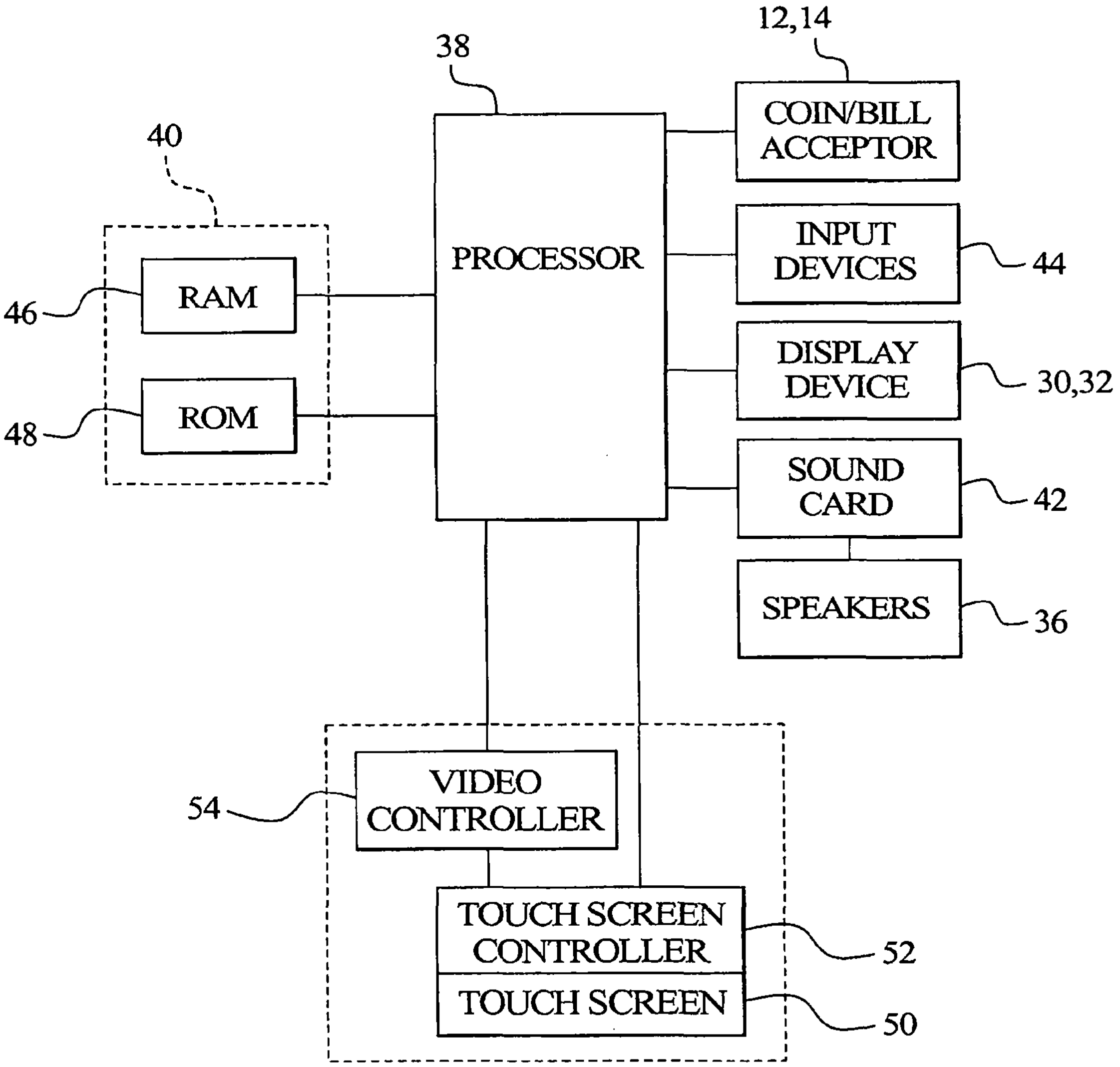
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. One or more secondary processors may also be employed in conjunction with the primary processor to control certain aspects of the game function. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a data network such as a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10, in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, in one embodiment gaming device 10 also gives players the opportunity to win credits in a bonus round. This type of gaming device 10 will include a program which will automatically begins a bonus round when the player has achieved a qualifying condition in the game. This qualifying condition can be a particular arrangement of indicia on a display device. The gaming device 10 may use mechanical devices or a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Probability Enhancing Trigger Symbol

Referring to FIGS. 1C, 3A, 3B, 4A and 4B, one embodiment of the reels of the present invention is illustrated where three reels are employed in a game. It should be appreciated that any suitable number of reels may be employed in the primary game. In this embodiment, each of the reels 34*a*, 34*b* and 34*c* includes symbols 100, which are represented by letters A, B, C, D, E, F, G and H, non-award or null symbols or blanks 104, at least one trigger symbol 102 and at least one wild symbol 105. It should be appreciated that any suitable number and types of symbols may be employed in a game according to the present invention. Each symbol is positioned at a reel stop position or reel stop on each of the reels. Therefore, one of the symbols such as one of the award symbols, one of the null symbols, the trigger symbol or the wild symbol will be indicated on a payline in the game.

Figures 3A, 3B:
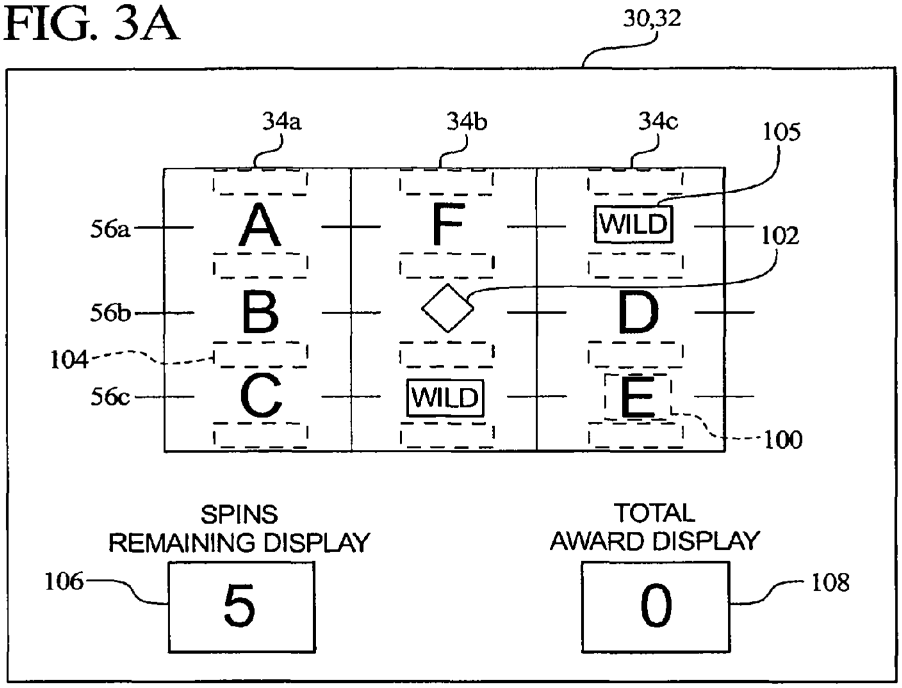
FIG. 3A is an enlarged elevation view of one of the display devices of FIGS. 1A and 1B illustrating one embodiment of the present invention.
FIG. 3B is an award table illustrating the symbol combinations and the awards associated with the symbols combinations of the embodiment of FIG. 3A.

Referring to FIG. 3A, in one embodiment the gaming device displays a plurality of reels and specifically three reels 34*a*, 34*b* and 34*c*. The reels include a plurality of symbols such as the letters A, B, C, D, E, F, G and H. The reels also include at least one trigger symbol, such as a diamond symbol 102. It should be appreciated that one or more of the reels may include at least on trigger symbol. Additionally, each of the reels includes at least one wild symbol 105 and at least one null symbol or blank 104. A probability of being indicated is associated with each of the symbols on the reels. In the primary game, the probability of each of the symbols being indicated on one of the reels is one in twenty (1/20) or 5.0% as shown in the probability table illustrated in FIG. 4A. If a triggering event occurs in the primary game, an award mode is initiated. In the award mode, the primary game is effectively reduced to a one-reel game. In addition, the null symbols 104 or blanks, and the trigger symbol, each re-spin or re-activate the reels. Thus, the effective number of symbols on the reels is reduced from twenty symbols to nine symbols, which further increases the probability that one of the symbols will be indicated on the reels. Several paylines, such as paylines 56*a*, 56*b* and 56*c* are associated with the reels. It should be appreciated that one or more paylines may be associated with the reels. A spins remaining display 106 indicates the number of spins remaining in the game. A total award display indicates the total value of the awards accumulated by the player in the game.

The gaming device provides the player with a number of spins in the game. The number of spins may be randomly determined, predetermined or determined in any suitable manner. The player uses the spins to activate or spin the reels 34*a*, 34*b* and 34*c*. The gaming device provides an award associated with one or more winning symbol combinations indicated on one of the paylines 56*a*, 56*b* or 56*c* associated with the reels. The player continues to spin the reels until the player has no spins remaining as indicated by the spins remaining display 106.

The trigger symbol or diamond symbol 102 increases the probability that the player will obtain one of the awards in the game and specifically increases the probability that the player will obtain the largest award such as the jackpot award in the game. The game preferably includes only one trigger symbol, designated as a diamond symbol 102, on one of the reels 34 in the game. In one embodiment, the middle reel 34*b*, includes the trigger symbol or diamond symbol 102. If the diamond symbol 102 is indicated on one of the paylines 56*a*, 56*b* or 56*c*, the gaming device initiates an award mode. In the award mode, the gaming device freezes or holds the reel 34*b* including the trigger symbol 102 stationary while the gaming device activates or spins the remaining reels or outside reels 34*a* and 34*c*, which are adjacent to the middle reel 34*b*. The gaming device activates or spins these reels until a wild symbol 105 is indicated on the same payline as the trigger symbol or diamond symbol 102.

Once the wild symbols 105 are indicated on reels 34*a* and 34*c* and on the same payline as the trigger symbol 102, the gaming device holds or keeps these reels stationary. The symbols on payline 56*b* are wild symbol 105*a* on reel 34*a*, trigger symbol or diamond symbol 102 on reel 34*b* and wild symbol 105*b* on reel 34*c*. The gaming device now re-spins or re-activates reel 34*b* until an award symbol 100 such as one of the letters is indicated on payline 56*b*. Any award symbol 100 indicated on that payline will provide a symbol combination having three identical symbols matching the award symbol 100 indicated on that payline. This occurs because two of the symbols on that payline are the wild symbols 105*a* and 105*b* as illustrated in FIG. 5C. Because only the middle reel 34*b* is re-activated or re-spun during the game to determine the award, the game is reduced to a one reel or single reel game. The player now only needs to obtain one award symbol to win an award in the award mode. More specifically, the player only has to spin one reel 34*b* to obtain the largest award such as the jackpot award in the game. Thus, because the award mode reduced the game to a one reel or single reel game, the probability of obtaining any of the awards, and specifically the largest award in the game, increases significantly.

In the award mode, when the middle reel 34*b* is re-activated and the trigger symbol or diamond symbol 102 is indicated on payline 56*b*, the gaming device re-spins or re-activates reel 34*b*. Thus in one embodiment, the trigger symbol or diamond symbol does not provide an award to the player in the game. In another embodiment, an award is associated with the trigger symbol and is provided to the player if the trigger symbol is indicated on the reel after the reel is re-activated in the award mode.

Similarly, if a non-award or null symbol (i.e., blank) 104 is indicated on payline 56*b* on reel 34*b*, the gaming device re-spins or re-activates reel 34*b*. Thus, a null symbol does not provide an award to the player; rather, the reels are re-spun to give the player another opportunity to obtain one of the awards in the game. Once an award symbol 100 is indicated on the designated payline on reel 34*b*, the gaming device provides an award associated with the award combination including those symbols. If the award symbol happens to be the jackpot symbol, the player obtains three of the jackpot symbols and therefore, the jackpot award in the game. The award received by the player in the game is transferred to the total award display 108 and provided to the player when the game ends. In one embodiment, the game ends when the player obtains an award in the game. In another embodiment, the game ends when the player runs out of spins as indicated by the spins remaining display 106.

In a further embodiment, the gaming device includes a modifier such as a multiplier which changes such as by increasing when the null symbol occurs on the reel. The modifier such as the multiplier is employed in one embodiment to increase the award determined by the generated symbol on the reel.

By effectively reducing the game to a single reel or one reel game, the present invention significantly increases the probability of obtaining an award in the game without changing the random probability of occurrence. In particular, the present invention increases the probability or the likelihood that the player will obtain the largest award such as the jackpot award in the game. For example, in a typical reel-type game, a player must obtain one of a plurality of designated symbol combinations on one or more of the paylines associated with a set of reels to obtain an award in the game. The gaming device or player spins the reels and the reels randomly indicate symbols on one or more of the paylines associated with the reels. If a winning symbol combination is indicated on one of the designated winning paylines in the game, the gaming device provides an award associated with that winning symbol combination. The probability of obtaining a particular symbol combination, however, is based on the number of reels in a game and the number of symbols included on those reels. Thus, the more reels and symbols in a game, the less likely or less probable it is that the player will obtain one of the winning symbol combinations in that game.

For example, a particular game of the gaming device may include three reels, such as reels 34*a*, 34*b* and 34*c* in FIG. 3A. In this example, each of the reels includes twenty reel positions, which include nine award symbols as symbols A, B, C, D, E, F, G, and H, one wild symbol, one trigger symbol and ten null symbols. In this example, the symbols must occur or be indicated on payline 56*b* to provide a winning symbol combination in the game. Thus, at the beginning of the game each symbol has a 5% (1/20) chance or probability of being indicated on payline 56*b* on each of the reels as illustrated in FIG. 4A. As a result, the overall probability that a particular symbol combination will occur on that payline is $(1/20)\times(1/20)\times(1/20)$, which equals $(1/800)$ or 0.013%. Therefore, in this example, because each symbol has a 5% $(1/20)$ chance or probability of being indicated on a single payline on the reels, the overall probability of a particular symbol combination occurring on that payline in the primary game (without the award mode) is $(1/800)$ or 0.013%.

Referring to FIG. 3B, an example of a payout or award table is illustrated. In this example, a winning symbol combination in the primary game includes three identical symbols. For instance, the jackpot award or largest award indicated on the table is the award of ten thousand associated with the symbol combination including three A symbols (i.e., A, A, A). The award associated with the other winning symbol combinations are also shown in the table. It should be appreciated that any suitable combination of symbols in a game may be designated as a winning symbol combination.

Referring to FIG. 4A, a probability table for a primary game or base game indicates the probability of each of the symbols being indicated on a payline for each reel in the three reel slot game shown in FIG. 3A. The table also indicates the probability of being indicated on a payline associated with each of the winning symbol combinations shown in FIG. 3B for each of the symbols on the reels and the probability of three null symbols or blanks being indicated on the payline. As illustrated in the table, the probability of each of the award symbols (i.e., A, B, C, D, E, F, G and H) being indicated on any one of the reels is $(1/20)$. The probability of a winning symbol combination including one of the award symbols, the trigger symbol or the wild symbol, being indicated on the designated payline is $(1/800)$ (i.e., $(1/20)\times(1/20)\times(1/20)$). The probability of three null symbols or blanks being indicated on the payline is $((10/20)\times(10/20)\times(10/20))$ or $(1/8)$. Therefore, a player has a one in eight thousand chance in the primary game to obtain one of the winning symbol combinations, and specifically of obtaining the jackpot award in the game.

In the award mode of the present invention, the number of reels is effectively reduced to one reel or one active reel such as reel 34*b*. As a result, the probability of obtaining a particular symbol or a particular symbol combination increases significantly. Referring to FIG. 4B, a probability table illustrates the probabilities of each of the symbols being indicated on the reel in the award mode. Additionally, the table illustrates the probability of a winning symbol combination, which in the award mode is one award symbol, being indicated on the payline in the award mode. Because the trigger symbol and the null symbols cause the reel to re-spin in the award mode, the number of effective award symbols in the award mode is reduced to nine. Therefore, the probability of each of the award symbols or the wild symbol being indicated on the payline in the game (through the award mode) is $(1/180)$, which is the probability of the trigger symbol being indicated on the payline in the primary game $(1/20)$ multiplied by the probability of any one of the award symbols or the wild symbol being indicated on the payline in the award mode, which is $(1/9)$. The probability of one of the award symbols or the wild symbol being indicated in the game (through the award mode) is therefore, $(1/20)\times(1/9)$ or $(1/180)$ as shown in FIG. 4B. Accordingly, the overall probability of obtaining a specific symbol combination is (0.013% $(1/800)$+0.56% $(1/180)$ which equal 0.573%.

Referring to FIG. 3A, in one example of the award mode of the present invention, if a trigger symbol or diamond symbol 102 is indicated on payline 56*b* in a primary game, an award mode is initiated and the outside reels 34*a* and 34*c* are re-activated or re-spun until wild symbols are indicated on payline 56*b*. Then, the reels 34*a* and 34*c* are held stationary while the middle reel 34*b* is re-activated or re-spun until an award symbol is indicated on payline 56*b*. The probability or likelihood of obtaining a particular symbol combination on the reels has now increased because the player only has to obtain one award symbol on reel 34*b* in order to obtain an award in the game.

Figure 1C:
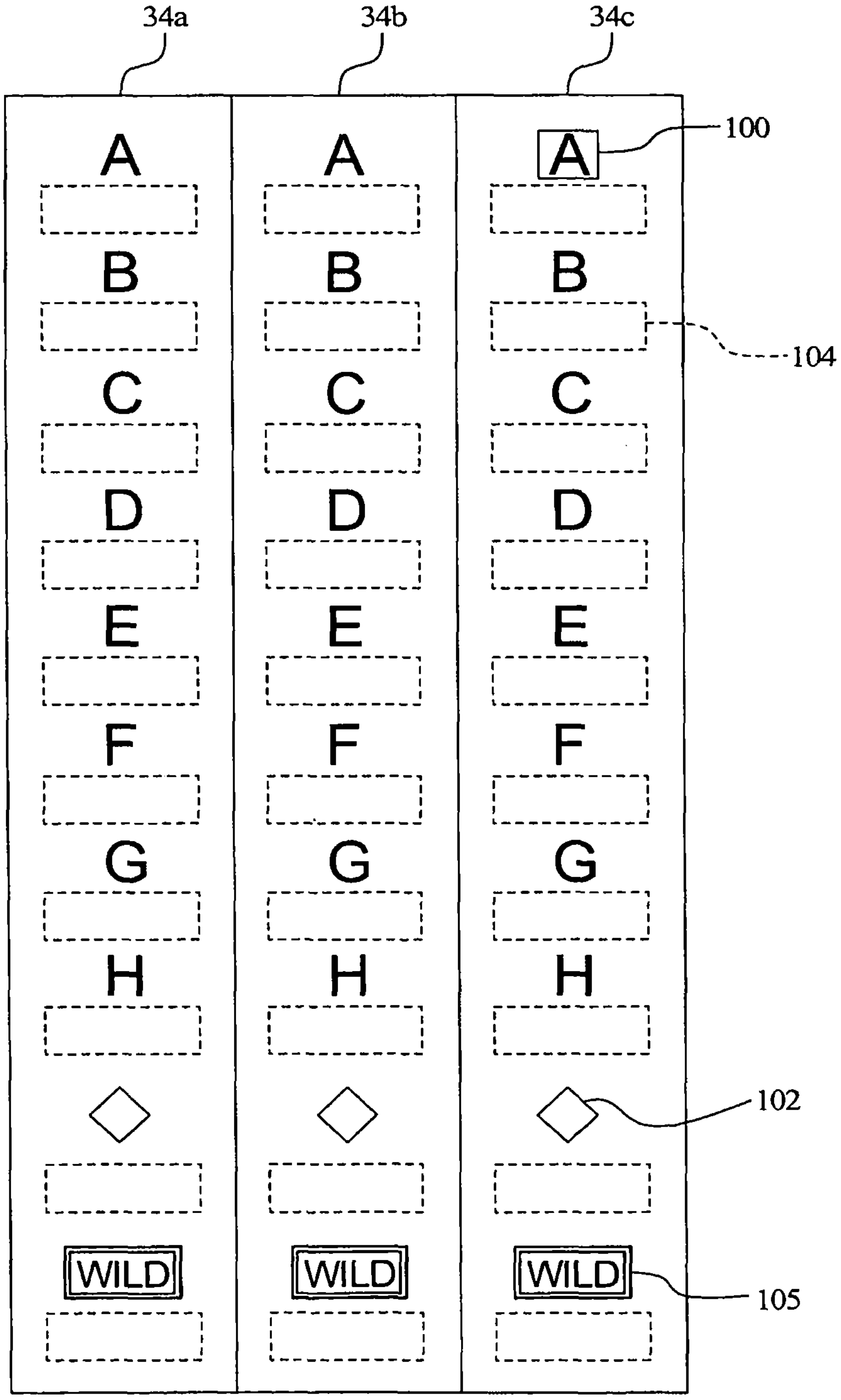
FIG. 1C is a enlarged elevation view of a set of reels and the reel stop positions included on the reels in a three reel slot game.

In this example, the middle reel 34*b* includes twenty reel positions including eight award symbols, one wild symbol, a trigger symbol or diamond symbol 102, and ten null symbols 104 as shown in FIGS. 1C and 3A. Therefore, the player initially has a one in twenty chance of obtaining the trigger symbol or diamond symbol 102 on reel 34*b* in the primary game as described above. In the award mode, if the player obtains the trigger symbol 102 or one of the null symbols 104 on payline 56*b* after the reel 34*b* is re-activated, the gaming device re-spins or re-activates reel 34*b* again until an award symbol 100 is indicated on payline 56*b*. Because the trigger symbol 102 and the null symbols 104 re-spin or re-activate the reels in the award mode, the actual number of symbols that provide an award and end the bonus mode are nine (i.e., the eight award symbols and the wild symbol). Therefore, the player has a one in nine chance of obtaining an award symbol 100 in the award mode and thereby a 11.1% chance of obtaining a winning symbol combination on payline 56*b*. As a result, the overall probability of obtaining a winning symbol combination on the reels in the award mode is determined by taking the probability of obtaining the trigger symbol or diamond symbol 102 on reel 34*b* in the initial or primary game, which is 1 in 20 $(1/20)$, multiplied by the probability or the likelihood of one of the award symbols being indicated on payline 56*b*, which is 1 in 9 $(1/9)$. The overall probability therefore equals $(1/180)$ or 0.56% for obtaining any one of the winning symbol combinations on the reels in the game (through the award mode) as shown in FIG. 4B. Thus, the probability of obtaining a winning symbol combination on the reels in the primary game is 1 in 8000 or 0.013% and this probability increases to 1 in 180 or 0.56% in the award mode. This significantly increases a player's opportunities or chances of obtaining one of the awards in the game and specifically a relatively large award such as the jackpot award. This increases a player's excitement and enjoyment of the game.

Figure 5A:
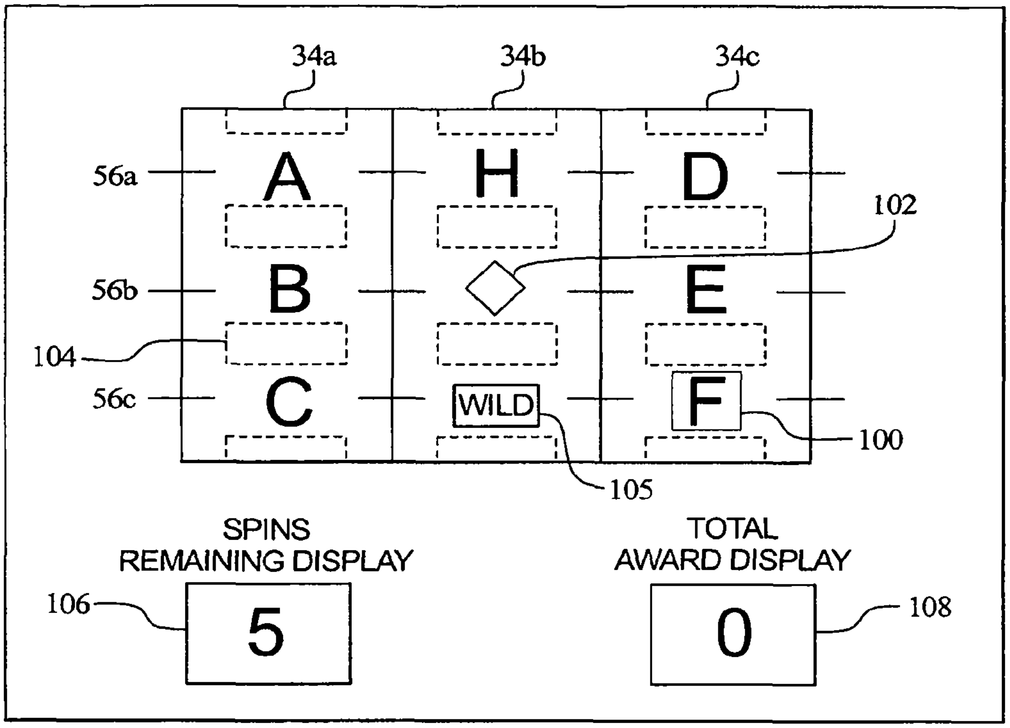
FIGS. 5A, 5B, 5C, 5D, 5E and 5F are enlarged front elevation views of an example of the embodiment shown in FIG. 3 illustrating a primary game and an award mode initiated by the occurrence of a triggering event in the primary game.
Figure 5B:
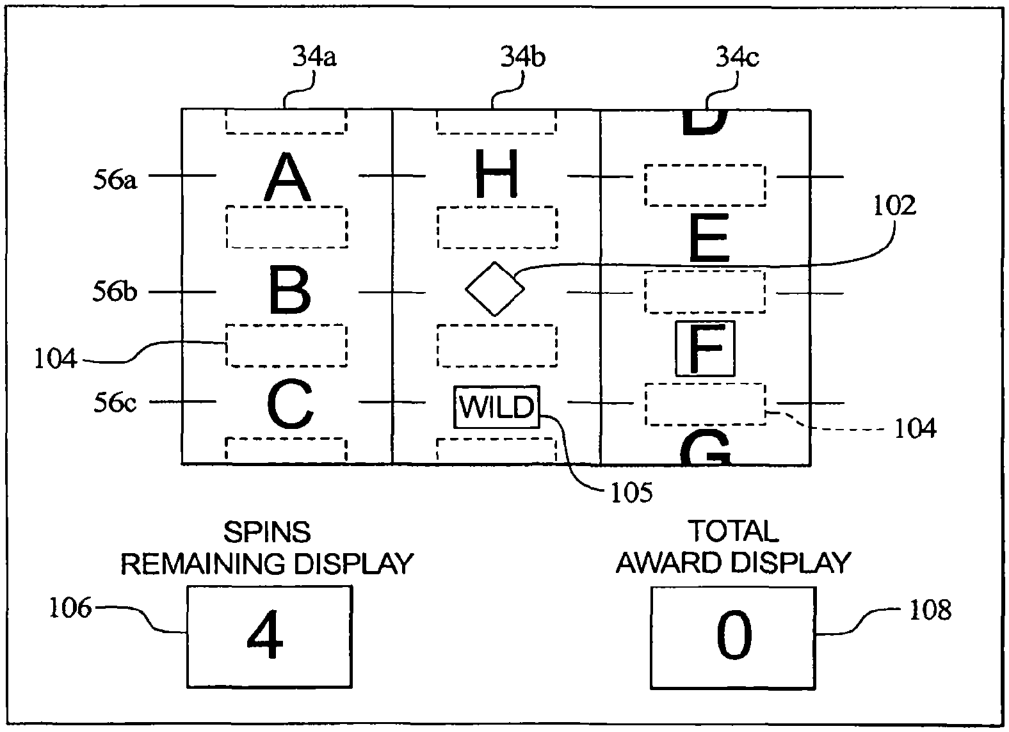
Figure 5C:
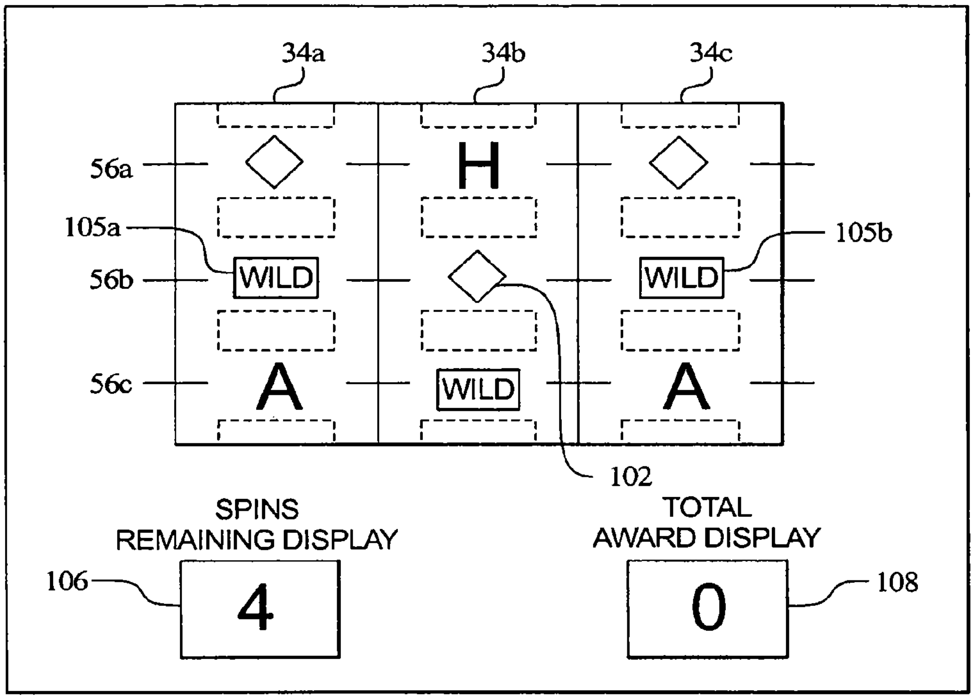

Referring to FIGS. 5A through 5F, an example of one embodiment of the present invention is illustrated where the player obtains a trigger symbol or diamond symbol 102 in the primary game or primary mode. This example includes three reels 34*a*, 34*b* and 34*c* as shown in FIG. 5A, where each reel includes a plurality of award symbols A, B, C, D, E, F, G and H, one trigger symbol designated as diamond symbol 102, one wild symbol 105 and ten null symbols 104. The player begins the game with five spins as indicated by the spins remaining display 106 as shown in FIG. 5A. Additionally, the player begins the game with an award of zero as indicated by the total award display 108. The player uses their first spin as shown in FIG. 5B to activate or spin the reels. A trigger symbol or diamond symbol 102 is indicated on payline 56*b* on reel 34*b*. The trigger symbol or diamond symbol 102 initiates the bonus mode of the present invention.

Referring to FIG. 5C, the gaming device freezes or holds reel 34*b* stationary while spinning or re-spinning the outside reels 34*a* and 34*c* until wild symbols 105*a* and 105*b*, respectively, are indicated on payline 56*b* on those reels. As indicated by the spins remaining display 106, the number of spins does not decrease when these reels are activated or re-activated to indicate the wild symbols. Additionally, the total award display 108 indicates that the player does not obtain an award for obtaining the trigger symbol (i.e., diamond symbol 102) or the wild symbols 105*a* or 105*b*. In another embodiment, the gaming device provides an award associated with the trigger symbol and/or the wild symbols.

Figure 5D:
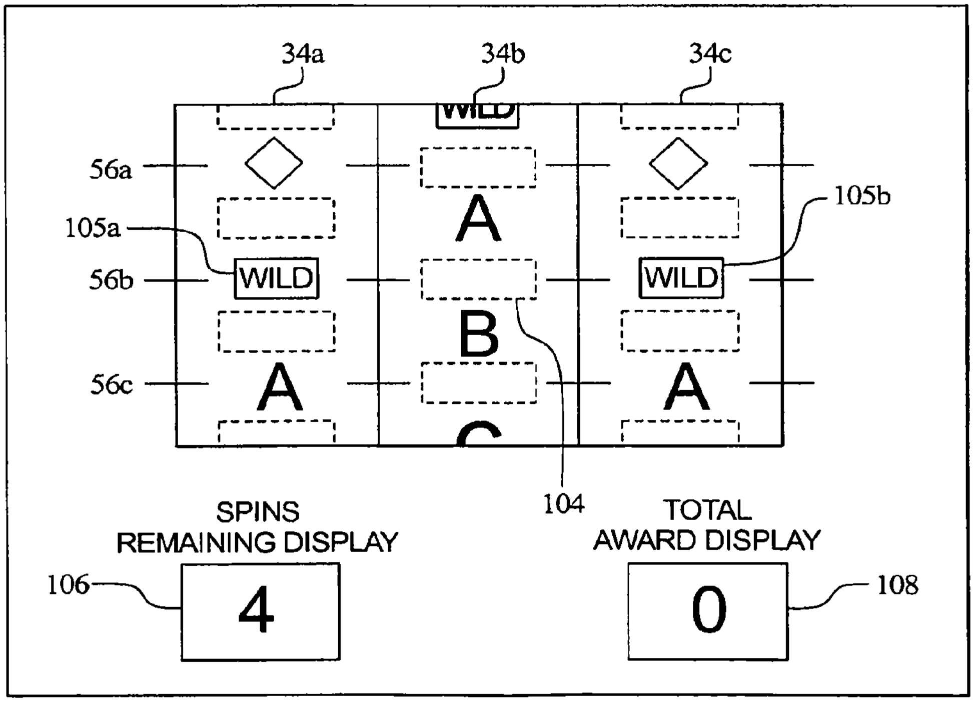

Referring to FIG. 5D, the outside reels 34*a* and 34*c* are stationary or cannot be re-activated, therefore the gaming device or player can only re-activate or re-spin reel 34*b*. In FIG. 5D the gaming device re-activates reel 34*b* and a null symbol 104 is indicated on payline 56*b*. The symbol combination of a wild symbol 105*a*, a null symbol 104 and wild symbol 105*b* on reels 34*a*, 34*b* and 34*c*, respectively, is not a winning symbol combination in the game. Therefore, the player does not receive an award for this symbol combination. However, the null symbol 104 does not end the game, but instead causes the gaming device to automatically re-spin or re-activate reel 34*b*. Thus, the null symbol 104 provides the player with another opportunity to obtain an award symbol in the game. The number of spins remaining in the award mode does not decrease as indicated by the spins remaining display 106 and the total award still remains at zero as indicated by the total award display 108.

Alternatively, as indicated above, the game upon the occurrence of the null symbol can change such as increment a modifier (such as a multiplier) which is employed to modify and preferably increase the award to the player.

Figure 5E:
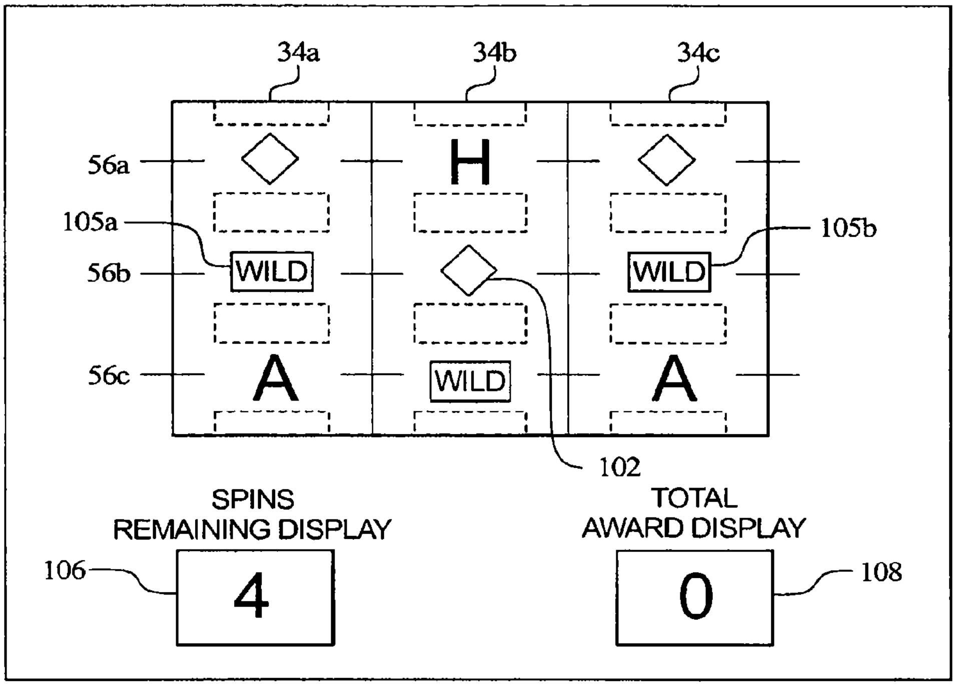

Referring to FIG. 5E, the gaming device or player re-activates reel 34*b* in the game. The trigger symbol or diamond symbol 102 is indicated on payline 56*b* on reel 34*b*. The resultant symbol combination is the wild symbol 105*a*, the trigger symbol 102 and the wild symbol 105*b*, on reels 34*a*, 34*b* and 34*c*, respectively, which is not a winning symbol combination. Similar to the null symbol 104 shown in FIG. 5D, the trigger symbol or diamond symbol 102 causes the gaming device to re-activate or re-spin reel 34*b*. Therefore, the player has another opportunity to obtain an award symbol in the game. The number of spins remaining in the bonus mode and the total award did not change in the game as indicated by the spins remaining display 106 and the total award display 108.

Figure 5F:
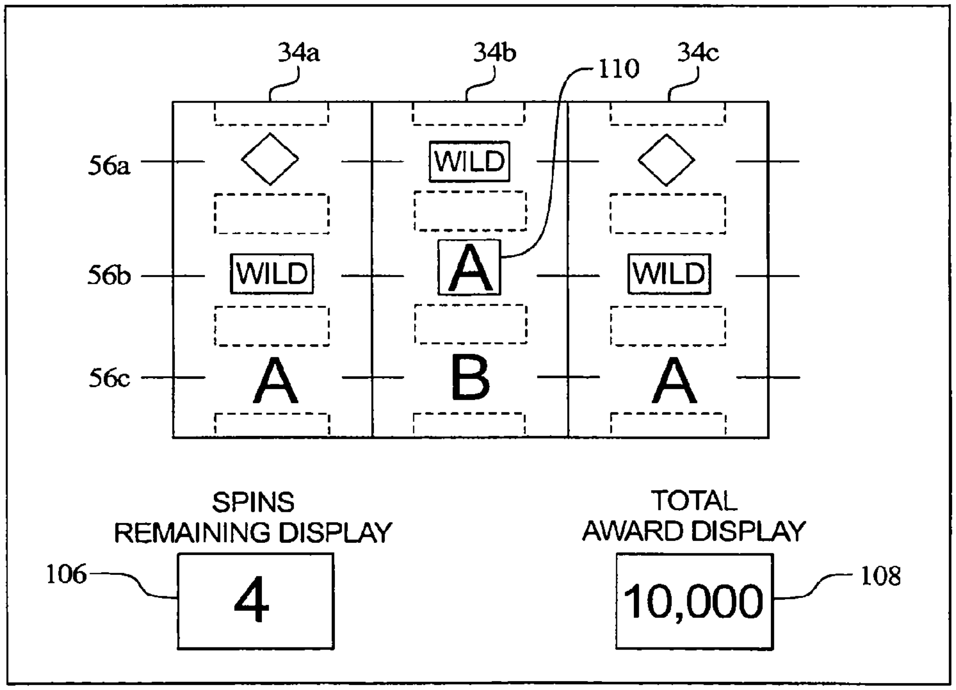

Referring to FIG. 5F, the gaming device or player re-spins and re-activates reel 34*b* in the award mode. After this spin, an award symbol designated by the letter A (110) is indicated on payline 56*b* on reel 34*b*. As a result, a winning symbol combination including wild symbol 105*a* on reel 34*a*, award symbol 110 on reel 34*b* and wild symbol 105*b* on reel 34*c* is indicated on payline 56*b*. This symbol combination provides a combination of three A symbols 110 because the wild symbols act or equal the award symbol 110. In this example, a combination including three A symbols provides the jackpot or largest award of ten thousand to the player as indicated by the total award display 108. Thus, the trigger symbol or diamond symbol 102 increases the probability or likelihood that the player will obtain an award and particularly the jackpot award in the game. The player has four spins remaining as indicated by the spins remaining display 106. In one embodiment, the player uses the remaining spins to spin the reels four more times in the award mode. In another embodiment, the game ends when the player obtains an award in the game.

Figure 6:
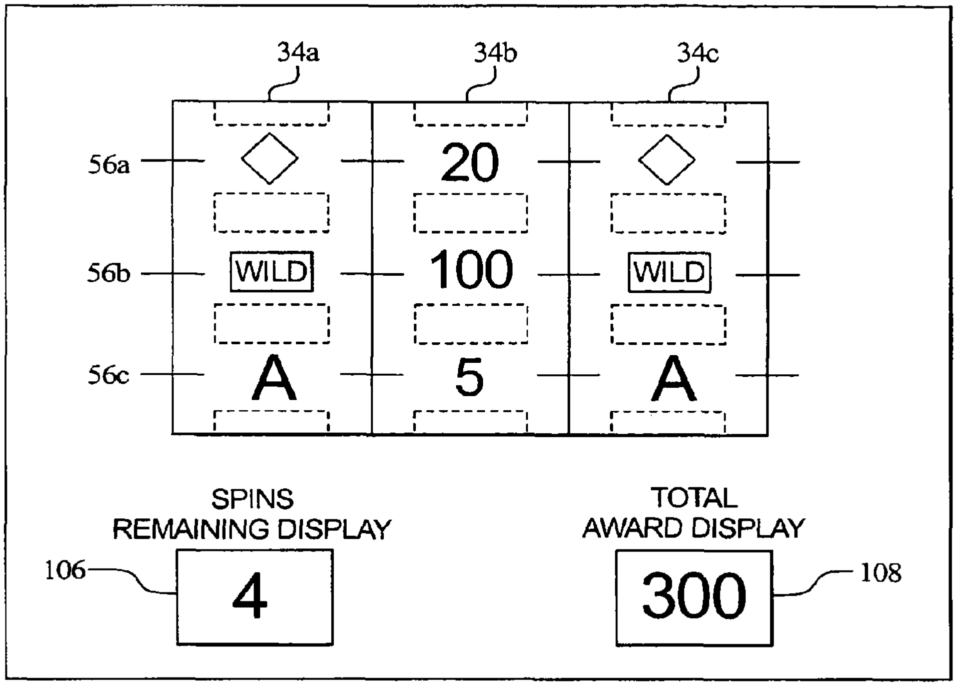
FIG. 6 is an enlarged elevation view of one of the display devices of FIGS. 1A and 1B illustrating another embodiment of the present invention.

Referring to FIG. 6, another embodiment of the present invention is illustrated where the symbols on the middle or central reel 34*b* include awards, such as the values of twenty, one hundred and five. In the award mode of this embodiment, the player re-spins or re-activates reel 34*b* until one of the award values are indicated on payline 56*b*. Instead of obtaining a winning symbol combination in the game, the player obtains three times the value of the indicated award or value on payline 56*b*. For example, in FIG. 6, the award of one hundred is indicated on payline 56*b* in the award mode. Therefore, the combination of the award of one hundred with the wild symbols 205*a* and 205*b* provide an award of three hundred because the wild symbols match the award value indicated on payline 56*b* on reel 34*b*. Thus, the player obtains an award of three hundred as indicated by the total award display 108 in the award mode. It should be appreciated that any symbols, values or any combination of symbols or values may be employed on the reels in the award mode of the game of the present invention.

Figure 7:
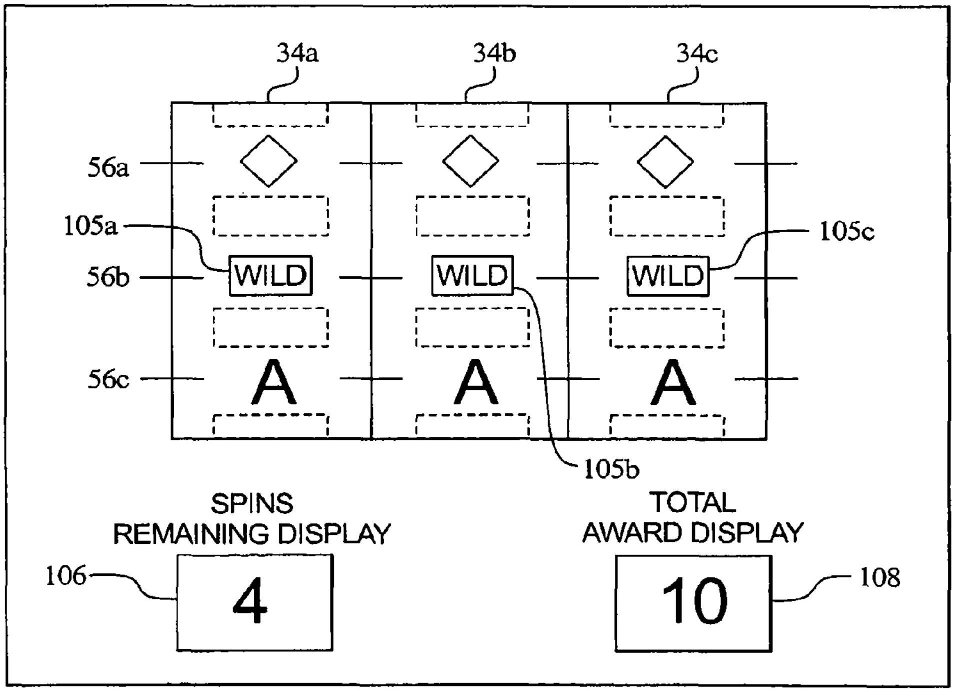
FIG. 7 is an enlarged elevation view of one of the display devices of FIGS. 1A and 1B illustrating a further embodiment of the present invention.

Referring to FIG. 7, a further embodiment of the present invention is illustrated where the middle or center reel 34*b* includes a wild symbol 105*b*. In this embodiment, the player re-spins reel 34*b* after obtaining the trigger symbol or diamond symbol 102 as described above. If the player obtains the wild symbol on payline 56*b* on reel 34*b*, the player obtains a symbol combination including three wild symbols 105*a*, 105*b* and 105*c*. Thus, the player obtains the largest award or the highest or most desirable symbol combination associated with the game such as the jackpot symbol combination because the player obtained three wild symbols on payline 56*b*. Thus, the wild symbol 105*b* increases the probability that the player will obtain the largest award such as the jackpot award in the game. In another embodiment, an award or award value is associated with the symbol combination including the wild symbol as shown in FIG. 3B.

In one alternative embodiment of the present invention, the number of spins of the reel can be limited such as to a predetermined number, a randomly determined number, or a number based on another functional game element such as the player's wager.

Free-Spin Re-initiation Mode

In another embodiment of the present invention, the gaming device includes a primary game operable upon a wager. As discussed above, the primary game includes a plurality of symbols, and may include a plurality of reels or any other suitable presentation device such as video poker. In one embodiment, the symbols include a plurality of award symbols and at least one triggering symbol or triggering symbol combination. The triggering symbol or symbol combination enables a player to enter a free spin mode where the player will have additional opportunities to win awards without having to make any additional wagers. In an alternative embodiment, the symbols also include a plurality of wild symbols.

Figure 8:
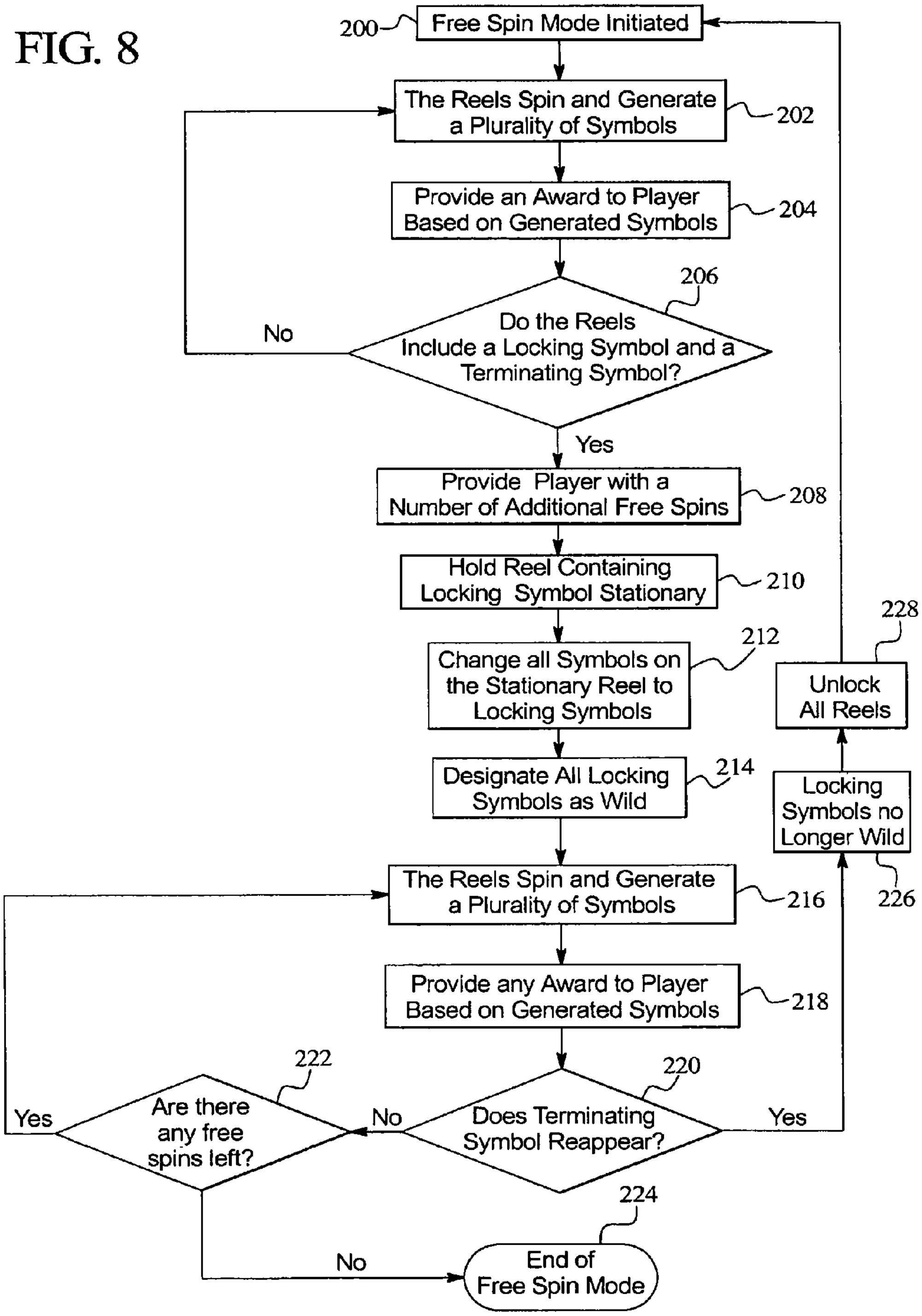
FIG. 8 is a flowchart of one of the embodiments of the present invention where a free spin mode is re-initiated.

Referring to FIG. 8, in one embodiment, the gaming device initiates the free spin mode, as indicated by block 200. The gaming device provides the player with an unlimited number of free activations or spins to re-activate the reels and obtain awards if there are any winning combinations of award symbols. The gaming device activates or spins the reels and generates a plurality of symbols as indicated by block 202. The gaming device determines if there are any winning combinations of symbols and provides any awards to the player based on the generated symbols as indicated by block 204. The plurality of symbols include at least one locking symbol and at least one terminating symbol. A terminating condition or the condition for limiting the unlimited free spins is fulfilled if both the locking symbol and the terminating symbol occur on the reels or are generated by a spin of the reels.

In an alternate embodiment, the locking symbol and the terminating symbol must occur on different reels. In a further embodiment, the locking symbol must occur on at least one of a first group of reels such as the first three reels and the terminating symbol must occur on at least one of a second group of reels such as the last two reels. In another embodiment, the locking symbol and the terminating symbol must occur on the same payline.

The free activation or free spin mode continues until the terminating condition occurs as indicated by decision diamond 206. When the terminating condition is fulfilled as indicated by decision diamond 206, the gaming device provides the player with a number of additional free spins as indicated by block 208. It should be appreciated that the number of additional free spins may be randomly determined, based on the wager in the base game, based on the number of paylines activated, predetermined, based on the result in the base game, or by any other suitable method. The gaming device then locks or holds stationary at least one, a plurality of or all of the reels with a locking symbol occurring on any payline as indicated by block 210. These reels will be held stationary or locked for the additional free spins or activations. In one embodiment, the locking symbol can function as an expanding wild symbol on the reel. The gaming device changes all symbols on the stationary reel to locking symbols as indicated by block 212. In an alternative embodiment, the gaming device changes at least one symbol on the stationary reel to a locking symbol. In a further embodiment, the gaming device changes a plurality of symbols on the stationary reel to locking symbols. The gaming device designates all locking symbols as wild as indicated by block 214. This means that for the additional free spins, the locking symbols may be used interchangeably with any other symbols on a payline. The gaming device spins or activates at least one unlocked reel and thus generates a plurality of symbols for evaluation as indicated by block 216. The gaming device determines if there are any winning combinations of symbols including the wild locking symbols and provides any awards to the player based on the generated symbols as indicated by block 218.

In one embodiment, if the terminating symbol does not reappear as indicated by decision diamond 220, the gaming device determines if there are any additional free spins remaining as indicated by decision diamond 222. If there are additional spins remaining, the gaming device spins or activates the reels to generate a plurality of symbols as indicated by block 216. In one embodiment, if the terminating symbol reappears on any payline of any reel during the additional free spins as indicated by decision diamond 220, all locking symbols are un-designated as wild as indicated by block 226. All reels are unlocked as indicated by block 228. The free spin mode with unlimited free spin is re-initiated as indicated by block 200, and the process is repeated.

Figure 9A:
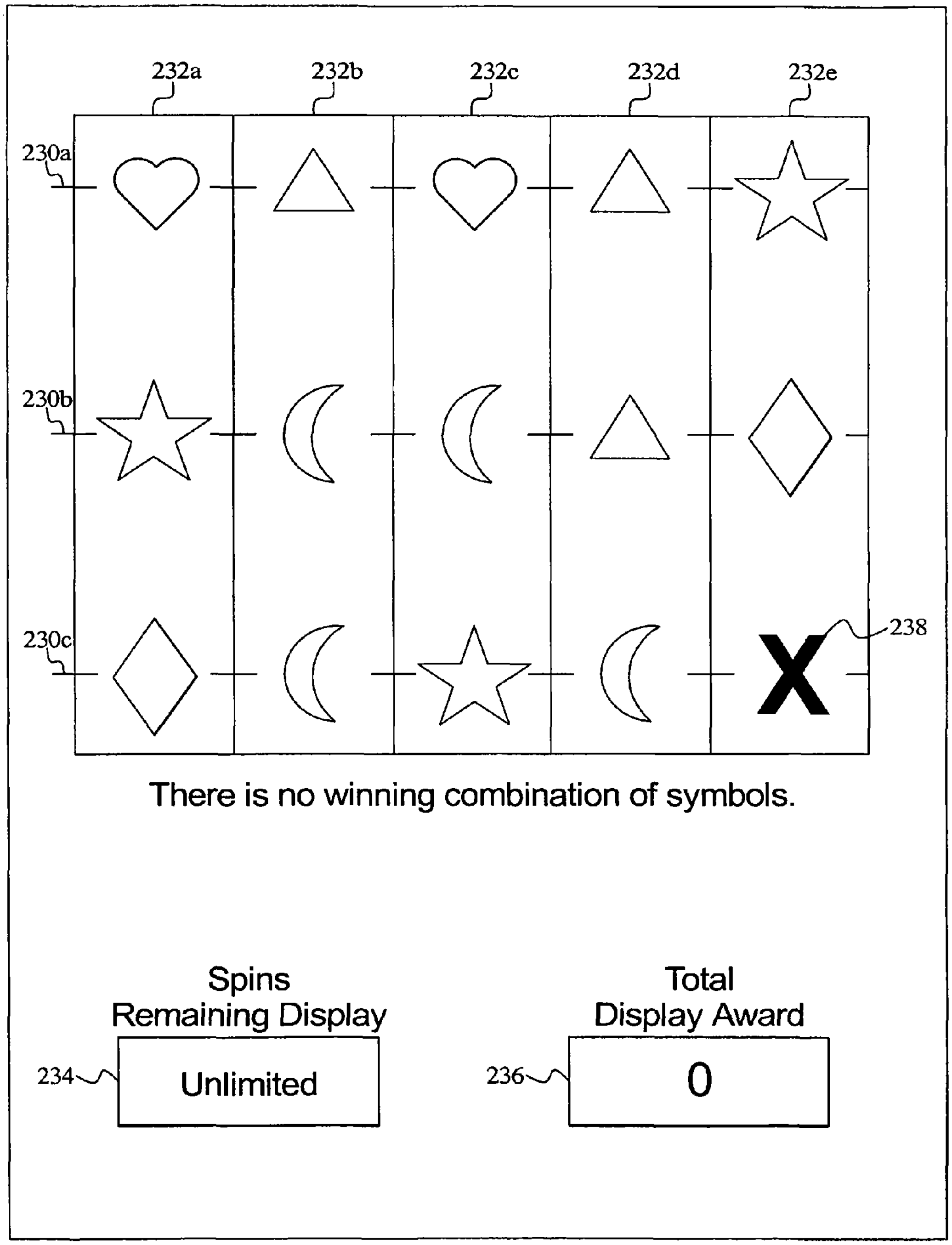
FIGS. 9A, 9B, 9C, 9D, 9E, 9F, 9G and 9H are enlarged front elevation views of one of the display devices of FIGS. 1A and 1B illustrating an example of one of the embodiments of the present invention where the free spin mode is re-initiated.

Referring now to FIG. 9A, in an example of the above embodiment, in the free spin mode, the gaming device includes or displays a plurality of reels 232*a*, 232*b*, 232*c*, 232*d* and 232*e*. In the illustrated embodiment, three paylines 230*a*, 230*b* and 230*c* are associated with the reels. The reels include a plurality of symbols. The symbols in this example are shapes such as stars, triangles, hearts, moons, and diamonds. It should be appreciated that the symbols may be shapes, numbers, letters, characters or any suitable images. The symbols also include at least one locking symbol 240 see (FIG. 9B) and at least one terminating symbol 238 (FIG. 9A). As stated above, the free spin mode termination condition is fulfilled if both the locking symbol 240 and the terminating symbol 238 are generated on the reels in an activation. The gaming device provides an award to the player if there is a winning symbol combination. In this example, four matching symbols, as indicated on any payline 230*a*, 230*b* or 230*c*, is a winning symbol combination. A spins remaining display 234 indicates the number of free activations or spins provided to the player for the free activation mode. At the initiation of the free spin mode, the number of free spins is unlimited, as indicated by the free spins display 234. A total award display 236 indicates the total award accumulated by the player in the game. At the start of the free spin mode, the total award is zero as indicated in FIG. 9A. The gaming device activates or spins the reels in the game and a symbol on each reel is indicated on each payline illustrated in FIG. 9A. Specifically, a terminating symbol 238 is indicated on reel 232*e* and payline 230*c*. In this particular free spin there is no winning combination of symbols. Also, in this embodiment, the terminating symbol 238 does not, by itself, terminate the free spin mode. The terminating condition is the occurrence of both the locking symbol 240 and the terminating symbol 238. Although the player has not won an award in the free spin in FIG. 9A, the additional free spins provide the player with other opportunities to obtain awards associated with winning symbol combinations. This increases the player's excitement and enjoyment in the game. The total award in the game is still zero as indicated by the total award display 236.

In one embodiment, the respective probabilities of occurrences associated with the terminating symbol and the locking symbol are less than at least one of the other symbols on the reels. In another embodiment, the respective probabilities associated with the terminating symbol and the locking symbol are less than the probabilities associated with a plurality of the other symbols on the reels. In a further embodiment, the respective probabilities associated with the terminating symbol and the locking symbol are less than the probabilities associated with all of the other symbols on the reels. In another embodiment, the probability associated with the terminating symbol is less than the probability associated with the locking symbol. In another embodiment they have equal or substantially equal probabilities of occurrence. In a further embodiment, the probability of occurrence associated with the locking symbol is less than the probability associated with the termination symbol.

Figure 9B:
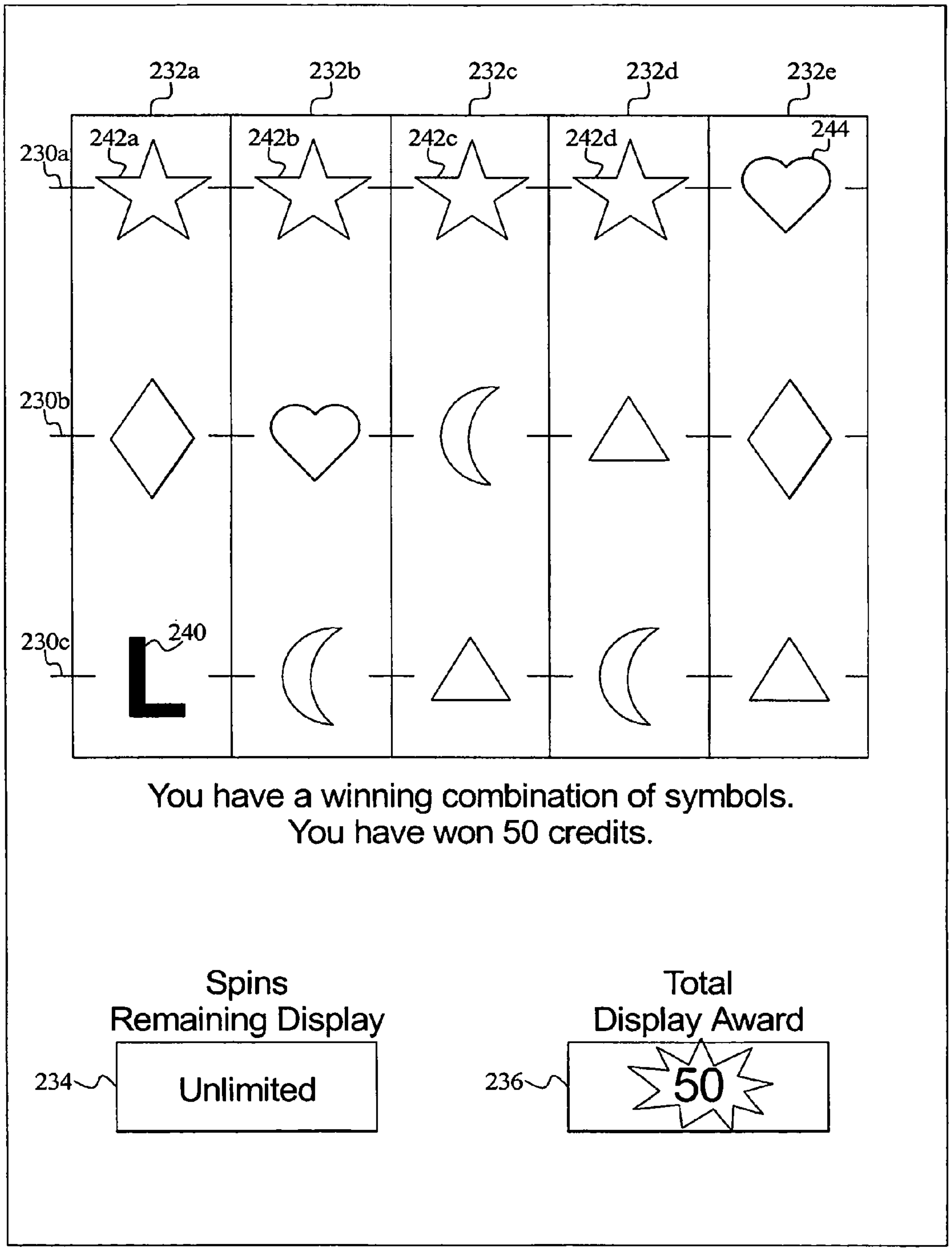

Referring to FIG. 9B, the gaming device activates or spins the reels using one of the unlimited free spins provided to the player, as indicated by the spins remaining display 234. The reels stop spinning and five symbols are indicated on payline 230*a*. The indicated symbols are four star symbols 242*a*, 242*b*, 242*c* and 242*d*, and a heart symbol 244. Thus, a symbol combination including four matching symbols, specifically four star symbols, is indicated on payline 230*a*. This is a winning symbol combination in this example. Therefore, the gaming device provides an award associated with the winning symbol combination (i.e., four star symbols), which in this example is an award of fifty. The award of fifty is added to the player's total award and the player now has a total award of fifty as indicated by the total award display 236. It should be appreciated that any award may be provided to the player and the award may be predetermined, randomly determined, based on a wager made by the player in the primary game that triggered the free spin mode, or determined by any other suitable method. Also, in this example, the locking symbol 240 does not, by itself, terminate the free spin mode. The terminating condition is the occurrence of both the locking symbol 240 and the terminating symbol 238. Therefore, the terminating condition has not occurred.

Figure 9C:
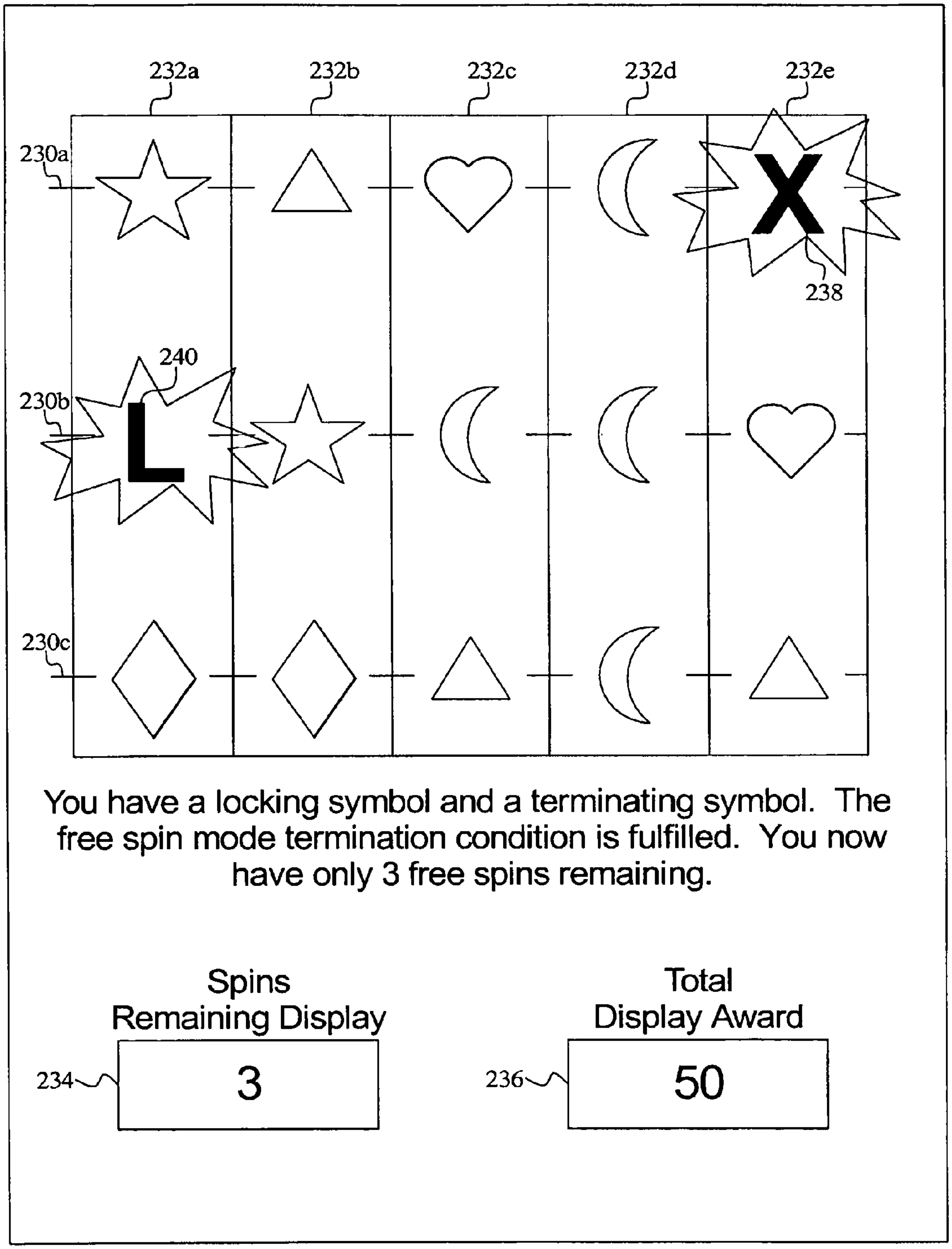

Referring now to FIG. 9C, the gaming device activates or spins the reels using one of the unlimited number of free spins provided to the player as indicated in the spins remaining display. The reels stop spinning and a locking symbol 240 is indicated on payline 230*b* and a terminating symbol 238 is indicated on payline 230*a*. Also, in this particular free spin there are no winning symbol combinations. Thus, a symbol combination that includes a locking symbol 240 and a terminating symbol 238 has been achieved, and the free spin mode termination condition has been fulfilled. The gaming device awards the player three additional free spins as indicated by the spins remaining display 234. It should be appreciated that any suitable number of free spins may be awarded and may be predetermined, randomly determined, determined based on a wager made by the player in the primary game that triggered the free spin mode, or determined by any other suitable method. The total award in the game is still fifty as indicated in the total award display 108. In an alternative embodiment, upon the occurrence of the terminating condition, a multiplier is provided to the player and applied to one, a plurality, or all awards in the free spin mode. In further embodiments, the multiplier may be predetermined, randomly determined, based on a wager by the player in the primary game that triggered the free spin mode, or determined by any other suitable method. The total award in the game is still fifty as indicated in the total award display 108.

Figure 9D:
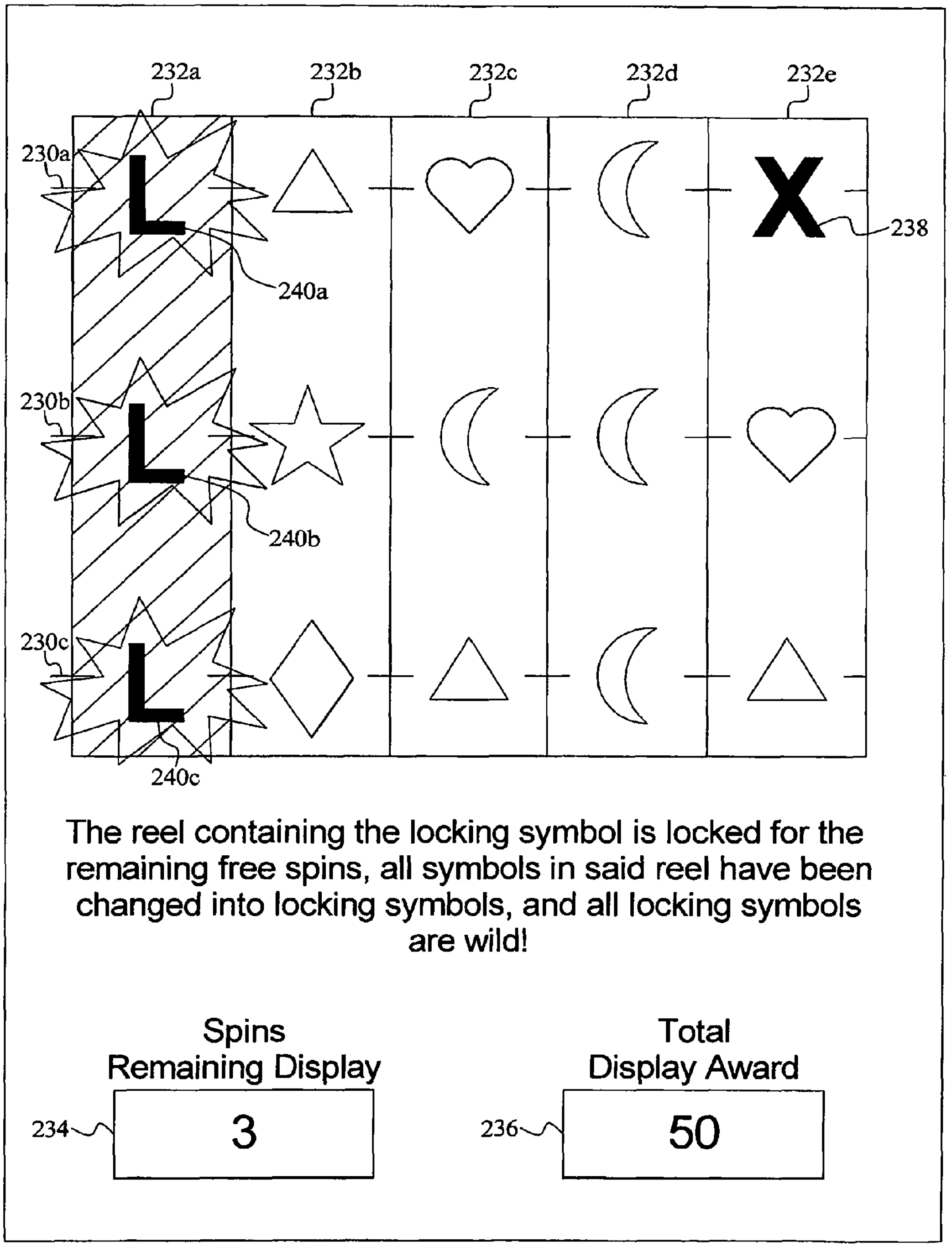

Referring now to FIG. 9D, the gaming device locks reel 232*a* including the locking symbol 240. In this example, the locking symbol 240*b* occurred on reel 232*a* and payline 230*b*. Also, in this embodiment, all of the other symbols on the reel 232*a* including the locking symbol 240*b* are changed into locking symbols 240*a* and 240*c*. Finally, all locking symbols 240*a*, 240*b* and 240*c* are designated as wild. Each locking symbol 240*a*, 240*b* and 240*c* functions as or substitutes for one of the symbols on the respective payline. Locking the reels and designating the locking symbols as wild increases the probability that on one of the remaining free spins the player will achieve a winning combination. This increases the player's excitement and enjoyment in the game. The spins remaining are three as indicated by the spins remaining display 234. The total award in the game is still fifty as indicated by the total award display 236.

Figure 9E:
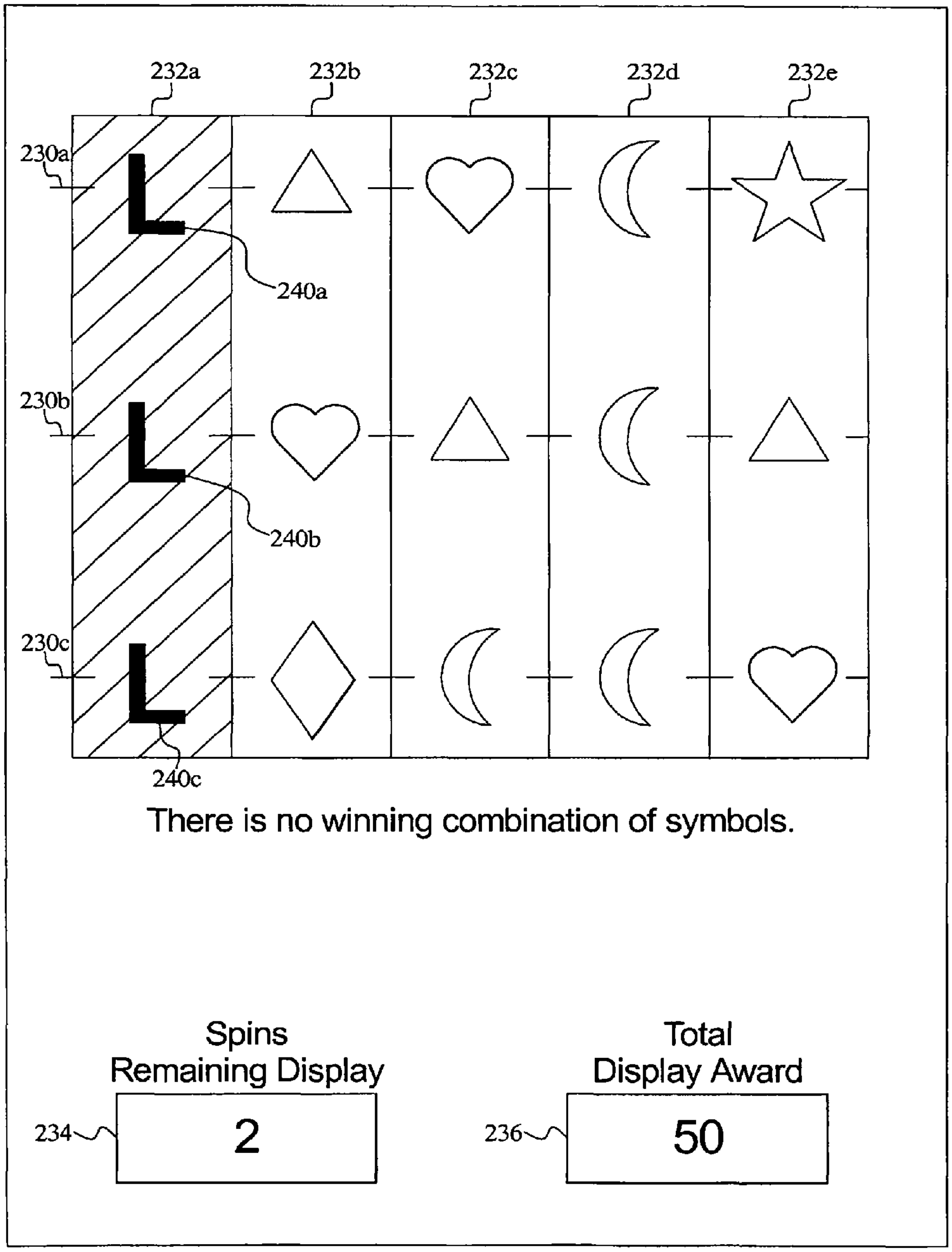

Referring now to FIG. 9E, the gaming device activates or spins the reels 232*b*, 232*c*, 232*d* and 232*e*, using one of the additional three free spins provided to the player and the number of spins remaining decreases to two as indicated by the spins remaining display 234. The reels stop spinning and no winning symbol combinations have occurred. The total award in the game is still fifty as indicated in the total award display 236.

Figure 9F:
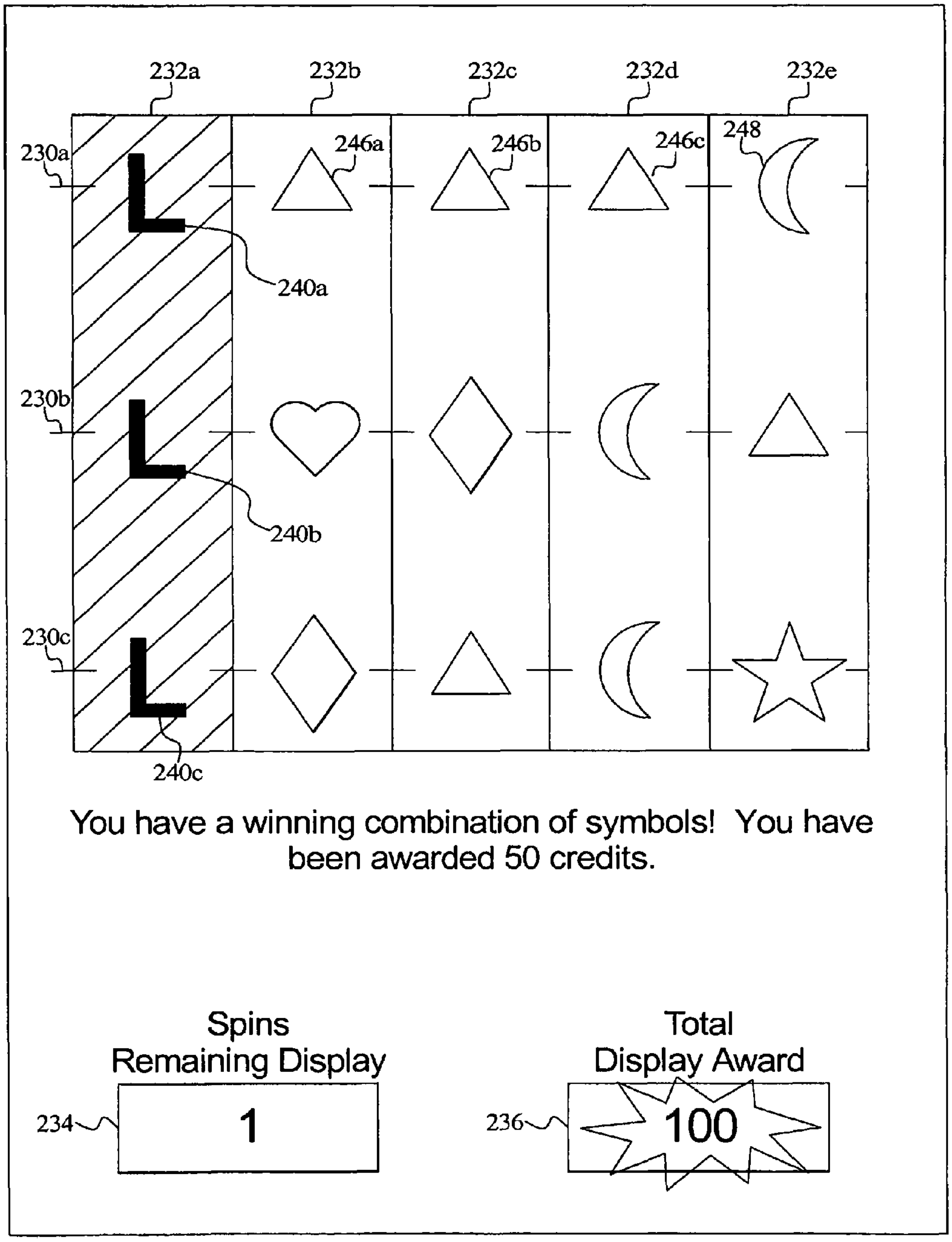

Referring now to FIG. 9F, the gaming device activates or spins the reels 232*b*, 232*c*, 232*d* and 232*e*, using one of the additional free spins provided to the player and the number of free spins decreases to one as indicated in the spins remaining display 234. The reels stop spinning and five symbols are indicated on payline 230*a*. The indicated symbols are a locking symbol 240*a*, three triangle symbols 246*a*, 246*b* and 246*c*, and a moon symbol 248. The locking symbol 240*a*, as a designated wild symbol, functions as or substitutes for one of the symbols indicated on the payline. Because there are three triangle symbols 246*a*, 246*b* and 246*c* on the payline, the locking symbol 240*a* functions as or substitutes for a triangle symbol on the payline 230*a*. Thus, a symbol combination including four matching symbols, specifically four triangle symbols, is indicated on payline 230*a*. This is a winning symbol combination in the game. Therefore, the gaming device provides an award associated with the winning symbol combination (i.e., four triangle symbols), which in this example is an award of fifty. The award of fifty is added to the player's total award and the player now has a total award of one-hundred as indicated by the total award display 236.

Figure 9G:
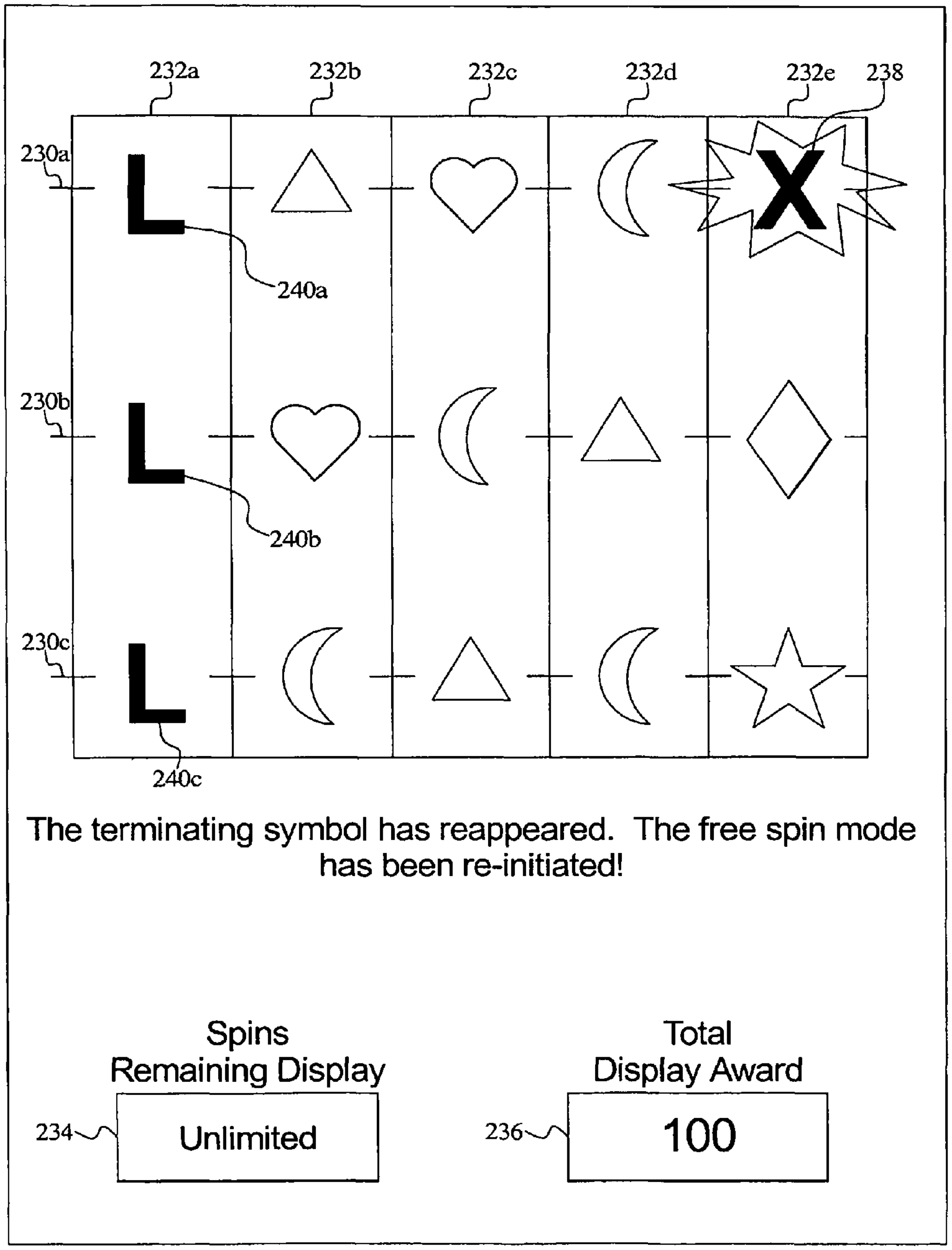

Referring now to FIG. 9G, the gaming device activates or spins the reels using one of the additional free spins provided to the player. The reels stop spinning and a terminating symbol 238 is indicated on payline 230*a*. Locking symbols 240*a*, 240*b* and 240*c* are also present on paylines 230*a*, 230*b* and 230*c* respectively. Also, in this particular free spin there are no winning symbol combinations. Thus, a symbol combination that includes a locking symbol 240 and a terminating symbol 238 has been achieved, and the free spin mode re-initiation condition has been fulfilled. In an alternate embodiment, some symbol other than a terminating symbol 240, could fulfill the free spin mode re-initiation condition. The gaming device unlocks all reels and un-designates the locking symbol as wild. Then, the gaming device re-initiates the unlimited free spin mode, and provides the player with an unlimited number of free spins as indicated by the spins remaining display 234. This allows the player to stay in the free spin mode longer and possibly earn more awards. This increases the player's excitement and enjoyment in the game. The total award in the game is still one-hundred as indicated in the total award display 236.

Figure 9H:
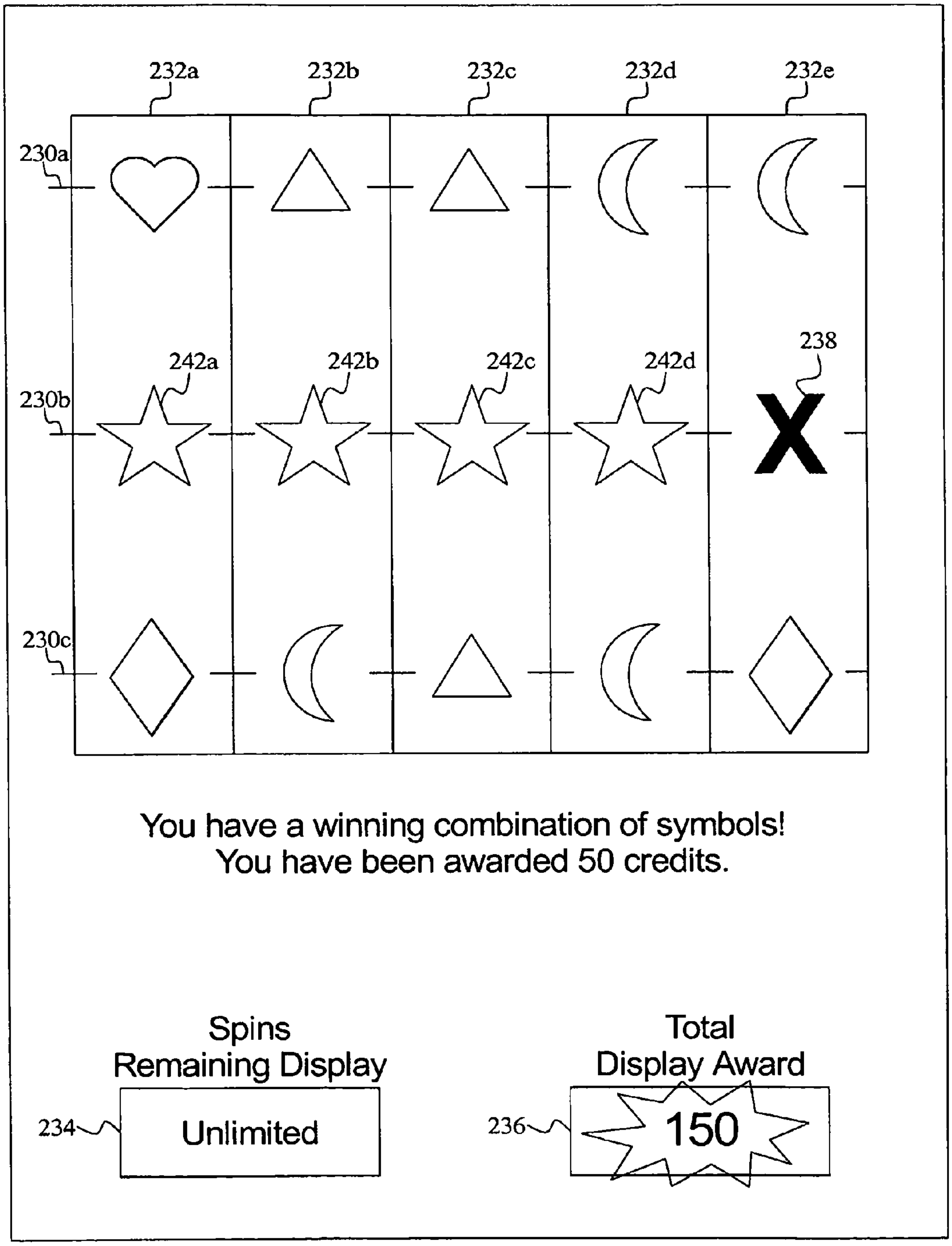

Referring now to FIG. 9H, the gaming device activates or spins the reels using one of the unlimited free spins provided to the player in the game, as indicated in the spins remaining display 234. The reels stop spinning and five symbols are indicated on payline 230*b*. The indicated symbols are four star symbols 242*a*-242*d* and a terminating symbol 238. Thus, a symbol combination including four matching symbols, specifically four star symbols, is indicated on payline 230*b*. This is a winning symbol combination in the game. Therefore, the gaming device provides an award associated with the winning symbol combination (i.e., four star symbols), which in this example is an award of fifty. The award of fifty is added to the player's total award and the player now has a total award of one-hundred fifty as indicated by the total award display 236. It should be appreciated that any award may be provided to the player and the award may be predetermined, randomly determined, based on a wager made by the player, or determined by any other suitable method. Also, in this embodiment, the terminating symbol 238 does not, by itself, terminate the free spin mode. The terminating condition is the occurrence of both the locking symbol 240 and the terminating symbol 238. Therefore, the terminating condition has not occurred.

Figure 10A:
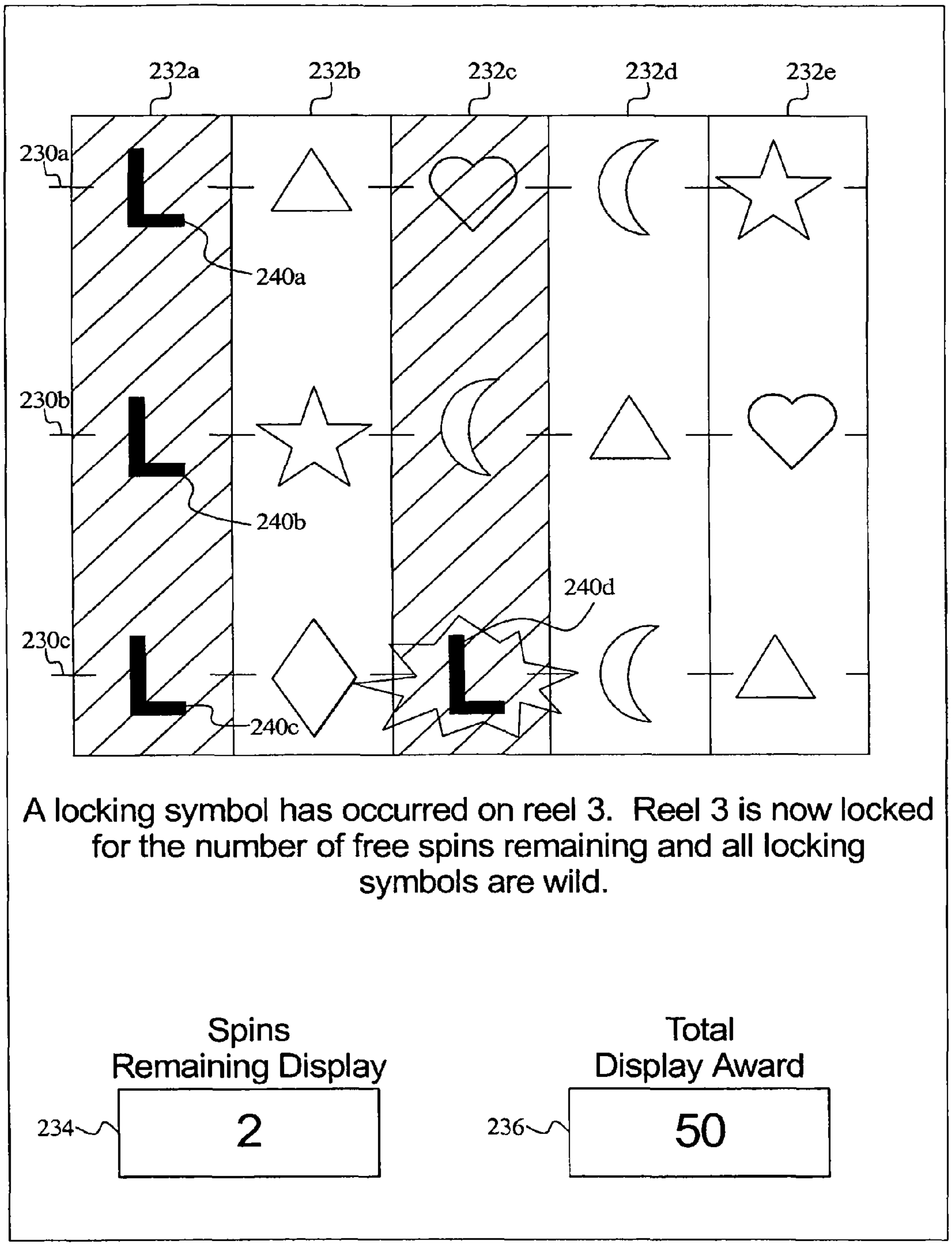
FIGS. 10A and 10B are enlarged front elevation views of one of the display devices of FIGS. 1A and 1B illustrating an example of one of the embodiments of the present invention where a locking symbol occurs on more than one reel.

In an alternative embodiment, generally illustrated in FIG. 10A, after the terminating condition has been fulfilled and the gaming device provides the player with a number of additional free spins as indicated by the spins remaining display 234, the gaming device locks all reels 232*a* containing a locking symbol 240. In this example a locking symbol 240*b* occurred on reel 232*a* and payline 230*b*. Also, in this embodiment, the locking symbol can function as an expanding wild symbol on the reel. All other symbols on the reel 232*a* containing the locking symbol 240*b* have been changed into locking symbols 240*a* and 240*c*, and all of the locking symbols 240*a*, 240*b* and 240*c* are designated as wild. The locking symbols function as or substitute for one of the symbols on the payline. Locking the reels, designating the locking symbols as wild, and changing all of the symbols on a reel to a locking symbol, increases the probability that on one of the remaining free spins, the player will achieve a winning combination. Furthermore, in this embodiment, if upon any of the remaining free spins a locking symbol appears on any other reel, that reel will also be locked for the number of free spins remaining. In this example, a locking symbol 240*d* has occurred on reel 232*c*. The gaming device holds reels 232*a* and 232*c* stationary for the remaining number of free spins, or until the re-initiation condition has been fulfilled.

Figure 10B:
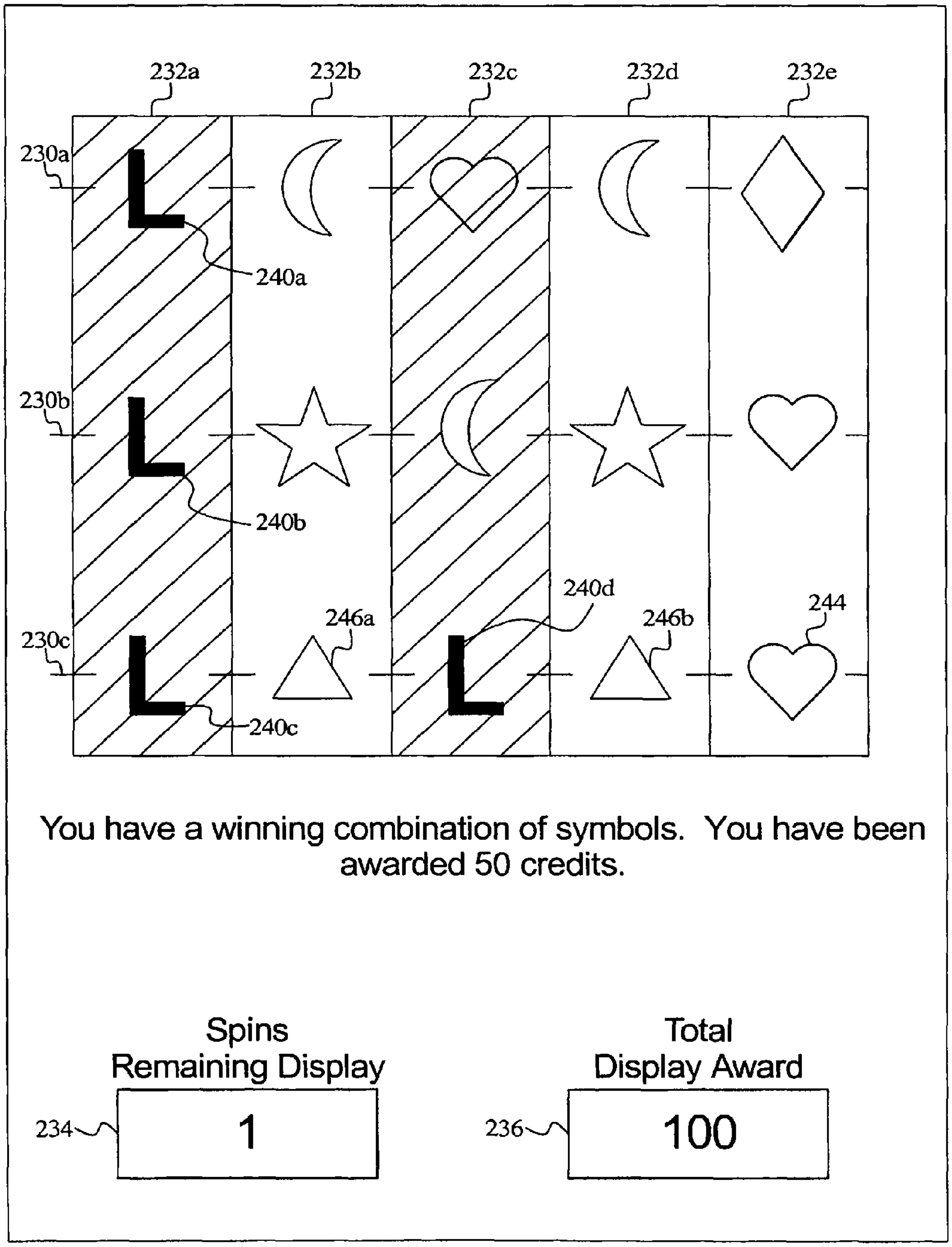

Referring now to FIG. 10B, the gaming device activates or spins the reels using one of the additional free spins provided to the player and the number of free spins decreases to one as indicated by the spins remaining display 234. The reels stop spinning and five symbols are indicated on payline 230*c*. The indicated symbols are two locking symbols 240*c* and 240*d*, two triangle symbols 246*a* and 246*b*, and one heart symbol 244. The two locking symbols 240*c* and 240*d*, as designated wild symbols, function as or substitute for one of the symbols indicated on the payline 230*c*. Because there are two triangle symbols 246*a* and 246*b* on the payline, the locking symbols 240*c* and 240*d* function as or substitute for a triangle symbol on payline 230*c*. Thus, a symbol combination including four matching symbols, specifically four triangle symbols, is indicated on payline 230*c*. This is a winning symbol combination in the game. Therefore, the gaming device provides an award associated with the winning symbol combination (i.e., four triangle symbols), which in this example is an award of fifty. The award of fifty is added to the player's total award and the player now has a total award of one-hundred as indicated by the total award display 236.

It should be appreciated that the present invention may be employed in a primary game, a bonus game, free spins game, a sub-game or in any suitable game.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

at least one display device;

at least one input device;

at least one processor; and at least one memory device storing a plurality of instructions, wherein the plurality of instructions, when executed by the at least one processor, cause the at least one processor to operate with the at least one display device and the at least one input device to:

display a play of a primary game upon a wager by a player, the primary game including a plurality of symbols;

upon the occurrence of a triggering event, provide a free activation mode, said free activation mode including an unlimited number of free plays of the primary game, wherein each of said free plays is without an additional wager by the player, wherein any awards for any winning symbol combinations which occur in each of said free plays are provided to the player; and for each of said free plays of the primary game, upon a generation of a terminating condition in said free plays, provide a free activation mode terminating event, wherein, in the free activation mode terminating event, a finite number of additional free plays of the primary game are provided, said finite number being at least one, wherein for each of the finite number of additional free plays, any awards for any winning symbol combinations which occur in said additional free play are provided to the player.

2. The gaming device of claim 1, wherein the triggering event occurs in a play of the primary game.

3. The gaming device of claim 1, wherein upon an occurrence of a free activation mode re-initiation event after the free activation mode terminating event, said free activation mode which provides said unlimited number of free plays of the primary game is re-initiated.

4. The gaming device of claim 1, wherein the primary game includes a plurality of reels and said symbols are on said reels.

5. A gaming device comprising:

at least one display device;

at least one input device;

at least one processor; and at least one memory device storing a plurality of instructions, wherein the plurality of instructions, when executed by the at least one processor, cause the at least one processor to operate with the at least one display device and the at least one input device to:

display a play of a primary game upon a wager by a player;

upon the occurrence of a triggering event, provide a free activation mode, said free activation mode including an unlimited number of free plays of a secondary game, said secondary game including a plurality of symbols, wherein each of said free plays is without an additional wager by the player, wherein any awards for any winning symbol combinations which occur in each of said free plays are provided to the player; and for each of said free plays of the secondary game, upon a generation of a terminating condition in said free plays, provide a free activation mode terminating event, wherein, in the free activation mode terminating event, a finite number of additional free plays of the secondary game are provided, said finite number being at least one, wherein for each of the finite number of additional free plays, any awards for any winning symbol combinations which occur in said additional free play are provided to the player.

6. The gaming device of claim 5, wherein the triggering event occurs in a play of the primary game.

7. The gaming device of claim 5, wherein upon an occurrence of a free activation mode re-initiation event after the free activation mode terminating event, said free activation mode which provides said unlimited number of free plays of the secondary game is re-initiated.

8. The gaming device of claim 5, wherein the primary game includes a plurality of reels.

9. The gaming device of claim 5, wherein the secondary game includes a plurality of reels and said symbols are on said reels.

10. The gaming device of claim 5, wherein the secondary game is the same as the primary game.

11. A gaming device comprising:

at least one display device;

at least one input device;

at least one processor; and at least one memory device storing a plurality of instructions, wherein the plurality of instructions, when executed by the at least one processor, cause the at least one processor to operate with the at least one display device and the at least one input device to:

display a play of a primary game upon a wager by a player;

upon the occurrence of a triggering event, provide a free activation mode, said free activation mode including an unlimited number of free plays of the primary game, wherein each of said free plays is without an additional wager by the player and includes a plurality of symbols, said plurality of symbols including at least one locking symbol and at least one terminating symbol, wherein any awards for any winning symbol combinations which occur in each of said free plays are provided to the player; and for each of said free plays of the primary came, upon a generation of at least one of the locking symbols and at least one of the terminating symbols in said free plays, provide a free activation mode terminating event, wherein, in the free activation mode terminating event, a finite number of additional free plays of the primary game are provided, said finite number being at least one, wherein for each of the finite number of additional free plays, any awards for any winning symbol combinations which occur in said additional free play are provided to the player.

12. The gaming device of claim 11, wherein the triggering event occurs in a play of the primary game.

13. The gaming device of claim 11, wherein upon an occurrence of a free activation mode re-initiation event after the free activation mode terminating event, said free activation mode which provides said unlimited number of free plays of the primary game is re-initiated.

14. The gaming device of claim 11, wherein the primary game includes a plurality of reels and said symbols are on said reels.

15. A gaming device comprising:

at least one display device;

at least one input device;

at least one processor; and at least one memory device storing a plurality of instructions, wherein the plurality of instructions, when executed by the at least one processor, cause the at least one processor to operate with the at least one display device and the at least one input device to:

display a play of a primary game upon a wager by a player;

upon an occurrence of a triggering event, provide a free activation mode, said free activation mode including an unlimited number of free plays of a secondary game, wherein each of said free plays is without an additional wager by the player, and includes a plurality of symbols, said plurality of symbols including at least one locking symbol and at least one terminating symbol, wherein any awards for any winning symbol combinations which occur in each of said free plays are provided to the player; and for each of said free plays of the secondary game, upon a generation of at least one of the locking symbols and at least one of the terminating symbols in said free plays, provide a free activation mode terminating event, wherein, in the free activation mode terminating event, a finite number of additional free plays of the secondary game are provided, said finite number being at least one, wherein for each of the finite number of additional free plays, any awards for any winning symbol combinations which occur in said additional free play are provided to the player.

16. The gaming device of claim 15, wherein the triggering event occurs in a play of the primary game.

17. The gaming device of claim 15, wherein upon an occurrence of a free activation mode re-initiation event after the free activation mode terminating event, said free activation mode which provides said unlimited number of free plays of the secondary game is re-initiated.

18. The gaming device of claim 15, wherein the primary game includes a plurality of reels and said symbols are on said reels.

19. The gaming device of claim 15, wherein the secondary game includes a plurality of reels and said symbols are on said reels.

20. The gaming device of claim 15, wherein the secondary game is the same as the primary game.

21. A gaming device comprising:

at least one display device;

at least one input device;

at least one processor; and at least one memory device storing a plurality of instructions, wherein the plurality of instructions, when executed by the at least one processor, cause the at least one processor to operate with the at least one display device and the at least one input device to:

display a play of a game, the game including a plurality of symbols;

upon an occurrence of a triggering condition, provide an unlimited number of plays of said game, wherein for each of the unlimited number of plays, any awards for any winning symbol combinations which occur in said play are provided to the player; and for each of said unlimited number of plays of said game, upon a generation of a terminating condition in said plays, provide a terminating event, wherein said terminating event includes a finite number of additional plays of the game, said finite number being at least one, wherein for each of the finite number of additional plays, any awards for any winning symbol combinations which occur in said additional play are provided to the player.

22. The gaming device of claim 21, wherein the triggering condition occurs in a play of a primary game operable upon a wager.

23. The gaming device of claim 21, wherein upon an occurrence of a re-initiation event after the terminating event, said unlimited number of plays of the game is re-initiated.

24. A gaming device comprising:

at least one display device;

at least one input device;

at least one processor; and at least one memory device storing a plurality of instructions, wherein the plurality of instructions, when executed by the at least one processor, cause the at least one processor to operate with the at least one display device and the at least one input device to:

display a play of a game including a plurality of reels, said reels including a plurality of symbols, said symbols including at least one locking symbol and at least one terminating symbol;

upon an occurrence of a triggering condition, provide an unlimited number of activations of said reels, wherein for each of the unlimited number of activations, any awards for any winning symbol combinations which occur on the reels in said activation are provided to the player; and for each of said unlimited number of activations, upon a generation of at least one of the locking symbols and at least one of the terminating symbols on said reels in one of said activations, provide a terminating event, wherein the terminating event includes a finite number of additional activations of the reels, said finite number being at least one, wherein for each of the finite number of additional activations, any awards for any winning symbol combinations which occur on the reels in said additional activation are provided to the player.

25. The gaming device of claim 24, wherein the triggering condition occurs in a play of a primary game operable upon a wager.

26. The gaming device of claim 24, wherein upon an occurrence of a re-initiation event after the terminating event, said unlimited number of activations of the reels is re-initiated.

27. A gaming device comprising:

at least one display device;

at least one input device;

at least one processor; and at least one memory device storing a plurality of instructions, wherein the plurality of instructions, when executed by the at least one processor, cause the at least one processor to operate with the at least one display device and the at least one input device to:

operate a game including a plurality of symbols; and after an occurrence of a triggering event:

(i) provide an unlimited number of plays of the game to a player until a terminating condition occurs by:

(a) causing a play of the game, (b) providing the player any awards for any winning symbol combinations which occur in said play of the game, and (c) repeating (a) and (b) if the terminating condition does not occur in said play of the game, wherein if the terminating condition occurs in said play of the game, the at least one processor provides a finite number of additional plays of the game, said finite number being at least one, and provides the player any awards for any winning symbol combination which occur in said finite number of additional plays of the game.

28. The gaming device of claim 27, wherein the triggering event occurs in a play of a primary game.

29. The gaming device of claim 27, wherein if a re-initiation condition occurs in any of said finite number of additional plays of the game, the at least one processor provides a further unlimited number of plays by repeating (a) to (c).

30. The gaming device of claim 27, wherein if the terminating condition occurs in any of said finite number of additional plays of the game, the at least one processor provides a further unlimited number of plays by repeating (a) to (c).

31. A gaming device comprising:

at least one display device;

at least one input device;

at least one processor; and at least one memory device storing a plurality of instructions, wherein the plurality of instructions, when executed by the at least one processor, cause the at least one processor to operate with the at least one display device and the at least one input device to:

operate a primary game upon a wager, said primary game including a plurality of symbols; and after an occurrence of a triggering event:

(i) provide an unlimited number of plays to a player until a terminating condition occurs by:

(a) causing a play of the primary game without any additional wager, (b) providing the player any awards for any winning symbol combinations which occur in said play of the primary game, and (c) repeating (a) and (b) if the terminating condition does not occur in said play of the primary game, wherein if the terminating condition occurs in said play of the primary game, the at least one processor provides a finite number of additional plays of the primary game, said finite number being at least one, and provides the player any awards for any winning symbol combinations which occur in said finite number of additional plays.

32. The gaming device of claim 31, wherein the triggering event occurs in a play of the primary game.

33. The gaming device of claim 31, wherein if a re-initiation condition occurs in any of said finite number of additional plays, the at least one processor provides a further unlimited number of plays by repeating (a) to (c).

34. The gaming device of claim 31, wherein if the terminating condition occurs in any of said finite number of additional plays, the at least one processor provides a further unlimited number of plays by repeating (a) to (c).

35. A gaming device comprising:

at least one display device;

at least one input device;

at least one processor; and at least one memory device storing a plurality of instructions, wherein the plurality of instructions, when executed by the at least one processor, cause the at least one processor to operate with the at least one display device and the at least one input device to:

operate a primary game upon a wager; and after an occurrence of a triggering event:

(i) provide an unlimited number of activations to a player until a terminating condition occurs by:

(a) causing an activation of a plurality of reels without any additional wager, said reels including a plurality of symbols, (b) providing the player any awards for any winning symbol combinations which occur in said activation, and (c) repeating (a) and (b) if the terminating condition does not occur in said activation, wherein if the terminating condition occurs in said activation, the processor provides a finite number of additional activations of the plurality of reels, said finite number being at least one, and provides the player any awards for any winning symbol combination which occur in said finite number of additional activations.

36. The gaming device of claim 35, wherein the triggering event occurs in a play of the primary game.

37. The gaming device of claim 35, wherein if a re-initiation condition occurs in any of said finite number of additional activations, the at least one processor is programmed to provide a further unlimited number of activations by repeating (a) to (c).

38. The gaming device of claim 35, wherein if the terminating condition occurs in any of said finite number of additional activations, the at least one processor is programmed to provide a further unlimited number of activations by repeating (a) to (c).

39. A method of operating a gaming device, said method comprising:

causing at least one processor to execute a plurality of instructions stored in at least one memory device to operate with at least one input device to receive a wager from a player;

causing the at least one processor to execute the plurality of instructions to operate with at least one display device to display a play of a primary game upon a wager by a player, the primary game including a plurality of symbols;

causing the at least one processor to execute the plurality of instructions to, upon the occurrence of a triggering event, provide a free activation mode, said free activation mode including an unlimited number of free plays of the primary game, wherein each of said free plays is without an additional wager by the player, wherein any awards for any winning symbol combinations which occur in each of said free plays are provided to the player; and for each of said free plays of the primary game, causing the at least one processor to execute the plurality of instructions to, upon a generation of a terminating condition in said free play, provide a free activation mode terminating event, wherein, in the free activation mode terminating event, a finite number of additional free plays of the primary game are provided, said finite number being at least one, wherein for each of the finite number of additional free plays, any awards for any winning symbol combinations which occur in said additional free play are provided to the player.

40. The method of claim 39, which includes causing the at least one processor to execute the plurality of instructions to cause the triggering event to occur in a play of the primary game.

41. The method of claim 39, which includes causing the at least one processor to execute the plurality of instructions to, upon an occurrence of a free activation mode re-initiation event after the free activation mode terminating event, re-initiate said free activation mode which provides said unlimited number of free plays of the primary game.

42. The method of claim 39, wherein the primary game includes a plurality of reels and the symbols are on the reels, and which includes causing the at least one processor to execute the plurality of instructions to operate with the at least one display device to display the reels and the symbols on the reels.

43. The method of claim 39, which is provided through a data network.

44. The method of claim 43, wherein the data network is the internet.

45. A method of operating a gaming device, said method comprising:

causing at least one processor to execute a plurality of instructions stored in at least one memory device to operate with at least one display device to display a play of a primary game upon a wager by a player;

causing the at least one processor to execute the plurality of instructions to, upon the occurrence of a triggering event, provide a free activation mode, said free activation mode including an unlimited number of free plays of a secondary game, said secondary game including a plurality of symbols, wherein each of said free plays is without an additional wager by the player, wherein any awards for any winning symbol combinations which occur in each of said free plays are provided to the player; and for each of said free plays of the secondary game, causing the at least one processor to execute the plurality of instructions to, upon a generation of a terminating condition in said free play, provide a free activation mode terminating event, wherein, in the free activation mode terminating event, a finite number of additional free plays of the secondary game are provided, said finite number being at least one, wherein for each of the finite number of additional free plays, any awards for any winning symbol combinations which occur in said additional free play are provided to the player.

46. The method of claim 45, which includes causing the at least one processor to execute the plurality of instructions to cause the triggering event to occur in a play of the primary game.

47. The method of claim 45, which includes causing the at least one processor to execute the plurality of instructions to, upon an occurrence of a free activation mode re-initiation event after the free activation mode terminating event, re-initiate said free activation mode which provides said unlimited number of free plays of the secondary game.

48. The method of claim 45, wherein the primary game includes a plurality of reels, and which includes causing the at least one processor to execute the plurality of instructions to operate with the at least one display device to display\ the reels.

49. The method of claim 45, wherein the secondary game includes a plurality of reels and the symbols are on the reels, and which includes causing the at least one processor to execute the plurality of instructions to operate with the at least one display device to display the reels and the symbols on the reels.

50. The method of claim 45, wherein the secondary game is the same as the primary game.

51. The method of claim 45, which is provided through a data network.

52. The method of claim 51, wherein the data network is the internet.

53. A method of operating a gaming device, said method comprising:

causing at least one processor to execute a plurality of instructions stored in at least one memory device to operate with at least one input device to receive a wager from a player;

causing the at least one processor to execute the plurality of instructions to operate with at least one display device to display a play of a primary game;

causing the at least one processor to execute the plurality of instructions to, upon the occurrence of a triggering event, provide a free activation mode, said free activation mode including an unlimited number of free plays of the primary game, wherein each of said free plays is without an additional wager by the player and includes a plurality of symbols, said plurality of symbols including at least one locking symbol and at least one terminating symbol, wherein any awards for any winning symbol combinations which occur in each of said free plays are provided to the player; and for each of said free plays of the primary game, causing the at least one processor to execute the plurality of instructions to, upon a generation of at least one of the locking symbols and at least one of the terminating symbols in said free play, provide a free activation mode terminating event, wherein, in the free activation mode terminating event, a finite number of additional free plays of the primary game are provided, said finite number being at least one, wherein for each of the finite number of additional free plays, any awards for any winning symbol combinations which occur in said additional free play are provided to the player.

54. The method of claim 53, which includes causing the at least one processor to execute the plurality of instructions to cause the triggering event to occur in a play of the primary game.

55. The method of claim 53, which includes causing the at least one processor to execute the plurality of instructions to, upon an occurrence of a free activation mode re-initiation event after the free activation mode terminating event, re-initiate said free activation mode which provides said unlimited number of free plays of the primary game.

56. The method of claim 53, wherein the primary game includes a plurality of reels and the symbols are on the reels, and which includes causing the at least one processor to execute the plurality of instructions to operate with the at least one display device to display the reels and the symbols on the reels.

57. The method of claim 53, which is provided through a data network.

58. The method of claim 57, wherein the data network is the internet.

59. A method of operating a gaming device, said method comprising:

causing at least one processor to execute a plurality of instructions stored in at least one memory device to operate with at least one input device to receive a wager from a player;

causing the at least one processor to execute the plurality of instructions to operate with at least one display device to display a play of a primary game;

causing the at least one processor to execute the plurality of instructions to, upon an occurrence of a triggering event, provide a free activation mode, said free activation mode including an unlimited number of free plays of a secondary game, wherein each of said free plays is without an additional wager by the player and includes a plurality of symbols, said plurality of symbols including at least one locking symbol and at least one terminating symbol, wherein any awards for any winning symbol combinations which occur in each of said free plays are provided to the player; and for each of said free plays of the secondary game, causing the at least one processor to execute the plurality of instructions to, upon a generation of at least one of the locking symbols and at least one of the terminating symbols in said free play, provide a free activation mode terminating event, wherein, in the free activation mode terminating event, a finite number of additional free plays of the secondary game are provided, said finite number being at least one, wherein for each of the finite number of additional free plays, any awards for any winning symbol combinations which occur in said additional free play are provided to the player.

60. The method of claim 59, which includes causing the at least one processor to execute the plurality of instructions to cause the triggering event to occur in a play of the primary game.

61. The method of claim 59, which includes causing the at least one processor to execute the plurality of instructions to, upon an occurrence of a free activation mode re-initiation event after the free activation mode terminating event, re-initiate said free activation mode which provides said unlimited number of free plays of the secondary game.

62. The method of claim 59, wherein the primary game includes a plurality of reels and the symbols are on the reels, and which includes causing the at least one processor to execute the plurality of instructions to operate with the at least on display device to display the reels and the symbols on the reels.

63. The method of claim 59, wherein the secondary game includes a plurality of reels and the symbols are on the reels, and which includes causing the at least one processor to execute the plurality of instructions to operate with the at least one display device to display the reels and the symbols on the reels.

64. The method of claim 59, wherein the secondary game is the same as the primary game.

65. The method of claim 59, which is provided through a data network.

66. The method of claim 65, wherein the data network is the internet.

67. A method of operating a gaming device, said method comprising:

causing at least one processor to execute a plurality of instructions stored in at least one memory device to operate with at least one display device to display a play of a game, the game including a plurality of symbols;

causing the at least one processor to execute the plurality of instructions to, upon an occurrence of a triggering condition, provide an unlimited number of plays of said game, wherein for each of the unlimited number of plays, any awards for any winning symbol combinations which occur in said play are provided to the player; and for each of said unlimited number of plays of said game, causing the at least one processor to execute the plurality of instructions to, upon a generation of a terminating condition in said play, provide a terminating event, wherein said terminating event includes a finite number of additional plays of the game, said finite number being at least one, wherein for each of the finite number of additional plays, any awards for any winning symbol combinations which occur in said additional play are provided to the player.

68. The method of claim 67, which includes causing the at least one processor to execute the plurality of instructions to cause the triggering condition to occur in a play of a primary game operable upon a wager.

69. The method of claim 67, which includes causing the at least one processor to execute the plurality of instructions to, upon an occurrence of a re-initiation event after the terminating event, re-initiate said unlimited number of plays of the game.

70. The method of claim 67, which is provided through a data network.

71. The method of claim 70, wherein the data network is the internet.

72. A method of operating a gaming device, said method comprising:

causing at least one processor to execute a plurality of instructions stored in at least one memory device to operate with at least one display device to display a play of a game including a plurality of reels, said reels including a plurality of symbols, said symbols including at least one locking symbol and at least one terminating symbol;

causing the at least one processor to execute the plurality of instructions to, upon an occurrence of a triggering condition, provide an unlimited number of activations of said reels, wherein for each of the unlimited number of activations, any awards for any winning symbol combinations which occur on the reels in said activation are provided to the player; and for each of said unlimited number of activations, causing the at least one processor to execute the plurality of instructions to, upon a generation of at least one of the locking symbols and at least one of the terminating symbols on said reels in said activation, provide a terminating event, wherein the terminating event includes a finite number of additional activations of the reels, said finite number being at least one, wherein for each of the finite number of additional activations, any awards for any winning symbol combinations which occur on the reels in said additional activation are provided to the player.

73. The method of claim 72, which includes causing the at least one processor to execute the plurality of instructions to cause the triggering condition to occur in a play of a primary game operable upon a wager.

74. The method of claim 72, which includes causing the at least one processor to execute the plurality of instructions to, upon an occurrence of a re-initiation event after the terminating event, re-initiate said unlimited number of activations of the reels.

75. The method of claim 72, which is provided through a data network.

76. The method of claim 75, wherein the data network is the internet.

77. A method of operating a gaming device, said method comprising:

causing at least one processor to execute a plurality of instructions stored in at least one memory device to operate with at least one display device to display a game including a plurality of symbols; and causing the at least one processor to execute the plurality of instructions to operate with the at least one display device, after an occurrence of a triggering event, to provide an unlimited number of plays of the game to a player until a terminating condition occurs by:

(a) displaying a play of the game, (b) providing the player any awards for any winning symbol combinations which occur in said play of the game, and (c) repeating (a) and (b) if the terminating condition does not occur in said play of the game, wherein if the terminating condition occurs in said play of the game, the at least one processor provides a finite number of additional plays of the game, said finite number being at least one, and provides the player any awards for any winning symbol combination which occur in said finite number of additional plays of the game.

78. The method of claim 77, which includes causing the at least one processor to execute the plurality of instructions to cause the triggering event to occur in a play of a primary game.

79. The method of claim 77, which includes, if a re-initiation condition occurs in any of said finite number of additional plays of the game, causing the at least one processor to execute the plurality of instructions to provide a further unlimited number of plays by repeating (a) to (c).

80. The method of claim 77, which includes, if the terminating condition occurs in any of said finite number of additional plays of the game, causing the at least one processor to execute the plurality of instructions to provide a further unlimited number of plays by repeating (a) to (c).

81. The method of claim 77, which is provided through a data network.

82. The method of claim 81, wherein the data network is the Internet.

83. A method of operating a gaming device, said method comprising:

causing at least one processor to execute a plurality of instructions stored in at least one memory device to operate with at least one input device to receive a wager from a player;

causing the at least one processor to execute the plurality of instructions to operate with at least one display device to display a primary game, said primary game including a plurality of symbols; and causing the at least one processor to execute the plurality of instructions to operate with the at least one display device after an occurrence of a triggering event to provide an unlimited number of plays to a player until a terminating condition occurs by:

(a) displaying a play of the primary game without any additional wager, (b) providing the player any awards for any winning symbol combinations which occur in said play of the primary game, and (c) repeating (a) and (b) if the terminating condition does not occur in said play of the primary game, wherein if the terminating condition occurs in said play of the primary game, the at least one processor provides a finite number of additional plays of the primary game, said finite number being at least one, and provides the player any awards for any winning symbol combinations which occur in said finite number of additional plays.

84. The method of claim 83, which includes causing the at least one processor to execute the plurality of instructions to cause the triggering event to occur in a play of the primary game.

85. The method of claim 83, which includes, if a re-initiation condition occurs in any of said finite number of additional plays, causing the at least one processor to execute the plurality of instructions to provide further unlimited number of plays by repeating (a) to (c).

86. The method of claim 83, which includes, if the terminating condition occurs in any of said finite number of additional plays, causing the at least one processor to execute the plurality of instructions to provide a further unlimited number of plays by repeating (a) to (c).

87. The method of claim 83, which is provided through a data network.

88. The method of claim 87, wherein the data network is the internet.

89. A method of operating a gaming device, said method comprising:

causing at least one processor to execute a plurality of instructions stored in at least one memory device to operate with at least one display device to display a primary game upon a wager; and causing the at least one processor to execute the plurality of instructions to operate with the at least one display device after an occurrence of a triggering event to provide an unlimited number of activations to a player until a terminating condition occurs by:

(a) displaying an activation of a plurality of reels without any additional wager, said reels including a plurality of symbols, (b) providing the player any awards for any winning symbol combinations which occur in said activation, and (c) repeating (a) and (b) if the terminating condition does not occur in said activation, wherein if the terminating condition occurs in said activation, the processor provides a finite number of additional activations of the plurality of reels, said finite number being at least one, and provides the player any awards for any winning symbol combination which occur in said finite number of additional activations.

90. The method of claim 89, which includes causing the at least one processor to execute the plurality of instructions to cause the triggering event to occur in a play of the primary game.

91. The method of claim 89, which includes, if a re-initiation condition occurs in any of said finite number of additional activations, causing the at least one processor to execute the plurality of instructions to provide a further unlimited number of activations by repeating (a) to (c).

92. The method of claim 89, which includes, if the terminating condition occurs in any of said finite number of additional activations, causing the at least one processor to execute the plurality of instructions to provide a further unlimited number of activations by repeating (a) to (c).

93. The method of claim 92, which is provided through a data network.

94. The method of claim 93, wherein the data network is the internet.

* * * * *